United States Patent
Johnson et al.

(10) Patent No.: US 9,935,314 B2
(45) Date of Patent: Apr. 3, 2018

(54) HIGH CAPACITY ELECTRODE MATERIALS FOR BATTERIES AND PROCESS FOR THEIR MANUFACTURE

(71) Applicant: UCHICAGO ARGONNE, LLC, Chicago, IL (US)

(72) Inventors: Christopher S. Johnson, Naperville, IL (US); Hui Xiong, Woodridge, IL (US); Tijana Rajh, Naperville, IL (US); Elena Shevchenko, Riverside, IL (US); Sanja Tepavcevic, Chicago, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 770 days.

(21) Appl. No.: 14/227,341

(22) Filed: Mar. 27, 2014

(65) Prior Publication Data
US 2014/0212733 A1 Jul. 31, 2014

Related U.S. Application Data

(63) Continuation of application No. PCT/US2012/042230, filed on Jun. 13, 2012.
(Continued)

(51) Int. Cl.
*H01M 4/04* (2006.01)
*H01M 4/48* (2010.01)
*H01M 4/13* (2010.01)
*H01M 4/139* (2010.01)
*H01M 4/66* (2006.01)
(Continued)

(52) U.S. Cl.
CPC ............... *H01M 4/48* (2013.01); *C25D 9/08* (2013.01); *C25D 9/10* (2013.01); *C25D 11/26* (2013.01); *H01M 4/0442* (2013.01); *H01M 4/0445* (2013.01); *H01M 4/0452* (2013.01); *H01M 4/13* (2013.01); *H01M 4/139* (2013.01); *H01M 4/483* (2013.01); *H01M 4/661* (2013.01); *H01M 10/054* (2013.01); *H01M 10/0525* (2013.01)

(58) Field of Classification Search
CPC ........ H01M 4/13; H01M 4/48; H01M 4/0445; H01M 4/0442
USPC .............................. 429/218.1, 231.5
See application file for complete search history.

(56) References Cited

U.S. PATENT DOCUMENTS

| 5,437,943 A | 8/1995 | Fujii et al. |
| 2009/0087716 A1 | 4/2009 | Elhamid et al. |

(Continued)

FOREIGN PATENT DOCUMENTS

WO WO 2008073968 A2 * 6/2008 ............. B82Y 30/00

*Primary Examiner* — Jonathan G Leong
(74) *Attorney, Agent, or Firm* — Olson & Cepuritis, Ltd.

(57) ABSTRACT

The present invention provides a nanostructured metal oxide material for use as a component of an electrode in a lithium-ion or sodium-ion battery. The material comprises a nanostructured titanium oxide or vanadium oxide film on a metal foil substrate, produced by depositing or forming a nanostructured titanium dioxide or vanadium oxide material on the substrate, and then charging and discharging the material in an electrochemical cell from a high voltage in the range of about 2.8 to 3.8 V, to a low voltage in the range of about 0.8 to 1.4 V over a period of about 1/30 of an hour or less. Lithium-ion and sodium-ion electrochemical cells comprising electrodes formed from the nanostructured metal oxide materials, as well as batteries formed from the cells, also are provided.

6 Claims, 20 Drawing Sheets

Related U.S. Application Data

(60) Provisional application No. 61/540,604, filed on Sep. 29, 2011.

(51) Int. Cl.
*H01M 10/0525* (2010.01)
*H01M 10/054* (2010.01)
*C25D 9/08* (2006.01)
*C25D 9/10* (2006.01)
*C25D 11/26* (2006.01)

(56) References Cited

U.S. PATENT DOCUMENTS

2009/0214942 A1* 8/2009 Frank .................. H01G 9/048
 429/122
2010/0320089 A1 12/2010 Misra et al.
2011/0206596 A1 8/2011 Tenne et al.

* cited by examiner

HIGH CAPACITY ELECTRODE MATERIALS FOR BATTERIES AND PROCESS FOR THEIR MANUFACTURE

CROSS-REFERENCE TO RELATED APPLICATION

This application is a continuation of International Application No. PCT/US2012/042230, filed on Jun. 13, 2012, which claims the benefit of U.S. Provisional Application Ser. No. 61/540,604 filed on Sep. 29, 2011, each of which is incorporated herein by reference in its entirety.

CONTRACTUAL ORIGIN OF THE INVENTION

The United States Government has rights in this invention pursuant to Contract No. DE-AC02-06CH11357 between the United States Government and UChicago Argonne, LLC representing Argonne National Laboratory.

FIELD OF THE INVENTION

This invention relates to high capacity materials for batteries and processes for preparing such materials. More particularly, this invention relates to amorphous titanium oxide and vanadium oxide materials useful as components of electrodes for lithium-ion and sodium-ion batteries.

BACKGROUND OF THE INVENTION

Limited energy resources and the growing demand to decrease greenhouse gas emissions have intensified research of carbon-free energy sources. Batteries that store high-energy densities will play a large role in implementation of green energy technologies and non-petroleum vehicular mobility. To date, rechargeable Li-ion batteries offer the highest energy density of any battery technology, and are expected to provide a solution for our future energy-storage requirements. Unfortunately, Li-ion batteries have a number of limitations, such as capacity loss over time during long-term cycling due to phase transitions leading to detrimental volume changes in the electrode materials. This can cause local atom rearrangements that block the diffusion of Li ions, leading to high over potentials and loss of capacity. In addition, Li-ion batteries that have been charged quickly can form dendritic Li deposition at the commercial graphite anode and can create a safety problem that in the worst scenario could cause thermal runaway, cell rupture and explosion. Use of chemically inert anode materials such as metal oxides with lithiation voltages positive of Li-deposition compared to carbon can address these issues and improve safety of Li-ion battery operation.

High-performance battery materials are critical for the development of new alternative energy storage systems. While Li-ion batteries are a mature technology for energy storage, disadvantages include cost, Li supply, safety, reliability and stability. Moreover, the electrolyte stability over time is additional major concern for long-term operation and advanced applications. Thus, the discovery, research and development of new transporting ions that can provide an alternative choice to Li batteries are essential for further advancement of energy storage materials. Sodium-based batteries are attractive due to the promise of low cost associated with the abundance of sodium, and enhanced stability of non-aqueous battery electrolytes due to the lower operating voltages. However, lower voltage leads to insufficient energy density, thus cathode materials for Na batteries must possess high-capacities. Since the ionic volume of sodium is almost twice that of lithium, unique crystalline structures have to be used to accommodate incorporation of large ions.

Titanium dioxide is one of the few metal oxide materials that intercalates Li ions at reasonably low voltage (approximately 1.2 V vs. Li/Li$^+$) and is suitable as a battery anode material. The first attempts of using $TiO_2$ for a durable and safe electrode material were focused on microcrystalline $TiO_2$ materials such as rutile, anatase, and $TiO_2(B)$. These electrodes materials showed moderate specific capacities (e.g., maximum Li uptake of 0.5Li/Ti for anatase and $TiO_2(B)$, and no activity for rutile) due to the limited room temperature reactivity and conductivity at microscale. Recently, the idea of using $TiO_2$ electrodes has been revisited with the consideration that nanosize morphologies provide enhanced intercalation kinetics and large surface area associated with high accessibility of transporting ions. Reversible capacities with stoichiometries up to about approximately 0.5-0.7Li/Ti have been demonstrate; however, repetitive cycling caused loss of capacity independent of the crystalline modification. It was expected that all $TiO_2$-based electrodes will have an intrinsic capacity limitation, because of a low number of crystallographic sites, and their electronically insulating structure. Both experimental and theoretical studies of intercalation of Li ions in crystalline polymorphs of $TiO_2$ show that high lithium content can be obtained exclusively at elevated temperatures raising concerns from the application point of view.

Vanadium pentoxide ($V_2O_5$) has been intensively studied as the positive electrode (anode) material for lithium ion batteries. In previous studies, various fabrication methods were used: sputtering, thermal evaporation, thermal decomposition, electrophoretic deposition and many chemical routes, such as hydrothermal synthesis, and sol-gel method. It has been reported that chemical composition, crystal structure and crystallinity of $V_2O_5$ may have pivotal roles in lithium ion intercalation capacity and cycling stability. To date, the practical application of vanadium oxides in lithium ion batteries was still limited due to the poor cyclic stability and undesirable phase transitions to inactive materials.

In contrast to lithium batteries, a report of Liu et al. considered employment of vanadium oxide by insertion/deinsertion of sodium-ion into $NaV_6O_{15}$ nanorods. Even though the morphology of the reported material could be retained, the initial discharge capacity of 142 mAhg$^{-1}$ substantially decreased by cycling at higher current densities, which led to poor overall performance. In order to explore full potential in utilization of nanostructured $V_2O_5$ electrodes for sodium batteries a detailed fundamental insight is necessary.

There is an ongoing need for new, more efficient, electrode materials for lithium-ion and sodium-ion batteries. The present invention addresses this need.

SUMMARY OF THE INVENTION

The present invention provides a nanostructured metal oxide material for use as a component of an electrode of a lithium-ion or sodium-ion battery. The material comprises a nanostructured titanium oxide or vanadium oxide film on a metal foil substrate. The film is produced by depositing or forming a nanostructured material selected from titanium dioxide and vanadium oxide on the surface of the substrate, and then charging and discharging the material in an electrochemical cell from a high voltage in the range of about 2.8 to 3.8 V, to a low voltage in the range of about 0.8 to 1.4 V over a period of about 1/30 of an hour or less.

In one embodiment, the nanostructured metal oxide material of the present invention comprises a film of titanium dioxide nanotubes. Preferably, the titanium dioxide nanotubes comprise densely packed $TiO_2$ nanotubes oriented perpendicular to the surface of the metal foil substrate. In one form of this embodiment, the substrate is a titanium foil and the densely packed $TiO_2$ nanotubes are amorphous and are produced by electrochemical anodization of a surface of the titanium foil, an subsequently drying the film to remove water therefrom (e.g., by heating at a temperature in excess of 100° C.). The densely packed $TiO_2$ nanotubes can have a wall thickness of about 8 to 25 nm and an outer tubular diameter of about 50 to 150 nm. In one preferred form, the nanotubes have a wall thickness of about 8 to 12 nm (e.g., about 10 nm) and an outer tubular diameter of about 50 to 70 nm (e.g., about 65 nm). In another form, the densely packed $TiO_2$ nanotubes have a wall thickness of about 18 to 25 nm and an outer tubular diameter of about 100 to 150 nm.

In another preferred form of this embodiment the titanium dioxide comprises nanostructured crystalline $TiO_2$ produced by electrochemical anodization of a surface of the titanium foil to form amorphous nanotubes, subsequently drying the film to remove water, and then charging and discharging the amorphous film in an electrochemical cell from a high voltage to a low voltage over a short period of time. For example, charging and discharging from a high voltage in the range of about 2.6 to 3 V (e.g., about 2.8 to 2.9 V), to a low voltage in the range of about 0.7 to 1 V (e.g., about 0.8 to 0.9 V), over a period of about 1/30 of an hour or less.

In another preferred embodiment, the nanostructured metal oxide material comprises a film of bilayered $V_2O_5$. In one preferred form, the bilayered $V_2O_5$ is amorphous and the layers thereof have an interlayer spacing of greater than about 12 Å. In another preferred form, the bilayered $V_2O_5$ is amorphous and is produced by electrochemical deposition from a $VO^{2+}$ salt solution (e.g., aqueous $VOSO_4$) onto the metal foil substrate, and drying deposited film to remove water therefrom. In another preferred form, the bilayered $V_2O_5$ comprises nanostructured crystalline bilayered $V_2O_5$ produced by electrochemical deposition from a $VO^{2+}$ salt solution onto the metal foil substrate to form an amorphous bilayered $V_2O_5$ film, drying film, and then charging and discharging the dried film in an electrochemical cell from a high voltage in the range of about 3.3 to 3.8 V (e.g., about 3.5 V), to a low voltage in the range of about 1.4 to 1.6 V (e.g., about 1.5 V), over a period of about 1/30 of an hour or less.

The metal foil substrate can comprise any metal suitable for use as a current collector for an electrode in lithium-ion or sodium-ion electrochemical cell or battery. Preferably, when the metal oxide material comprises titanium oxide, the substrate comprises titanium. When the metal oxide material comprises vanadium oxide, the substrate preferably comprises nickel or stainless steel.

In one aspect, the present invention provides a lithium-ion electrochemical cell comprising a cathode, an anode, and a nonaqueous lithium-containing electrolyte therebetween. In one preferred form, the anode comprises a nanostructured titanium oxide material of the invention as described herein. If desired, the anode can comprise a carbon material or other suitable components in addition to the titanium oxide material. The cathode in this embodiment can comprise a vanadium oxide material as described herein, or can comprise any other cathode material suitable for use in electrochemical cells, such cathode materials being well known in the battery art.

In another preferred form of the lithium-ion electrochemical cell, the cathode comprises a nanostructured vanadium oxide material of the invention as described herein. The anode in this form can comprise a titanium oxide material as described herein, or can comprise any other anode material suitable for use in electrochemical cells, such anode materials being well known in the battery art.

The electrolyte in the lithium-ion electrochemical cells and batteries can comprise any lithium-ion containing electrolyte material that is suitable for use in lithium-ion electrochemical cells and batteries. Such electrolyte materials also are well known in the battery art.

The present invention also provides a sodium-ion electrochemical cell comprising a cathode, an anode, and a nonaqueous sodium-containing electrolyte therebetween. In one preferred form, the anode comprises a nanostructured titanium oxide material of the invention as described herein. If desired, the anode can comprise a carbon material or any other suitable component in addition to the titanium oxide material. The cathode in this embodiment can comprise a vanadium oxide material as described herein, or can comprise any other cathode material suitable for use in electrochemical cells, such cathode materials being well known in the battery art.

In another preferred form of the sodium-ion electrochemical cell, the cathode comprises a nanostructured vanadium oxide material of the invention as described herein. The anode in this form can comprise a titanium oxide material as described herein, or can comprise any other anode material suitable for use in electrochemical cells, such anode materials being well known in the battery art.

The electrolyte in the sodium-ion electrochemical cells and batteries can comprise any sodium-ion containing electrolyte material that is suitable for use in sodium-ion electrochemical cells and batteries. Such electrolyte materials also are well known in the battery art.

The electrochemical cells of the present invention can be assembled in to a battery by electrochemically linking the cells (e.g., in series or parallel or both), if desired. In addition, the batteries and electrochemical cells can include other components besides the cathode, anode and electrolyte, such as a housing, porous separators, binders, and the like, as is well known in the battery art.

The present invention provides an electrochemically driven transformation of amorphous $TiO_2$ nanotubes for Li-ion battery anodes into a face-centered-cubic $Li_2Ti_2O_4$ crystalline phase that self-improves as the cycling proceeds. The intercalation and deintercalation processes of Li ions in the electrochemically-grown $TiO_2$ nanotubes provide spontaneous development of a long-range order in amorphous $TiO_2$ in the presence of high concentration of Li ions (>75%). Reversible intercalation and preservation of the resultant cubic structure during cycling is maintained, and the electrode shows superior stability for more than 600 cycles. Moreover, the adopted cubic structure supports very fast (26 s) charging with good retention of capacity. A full lithium-ion cell with a $LiNi_{0.5}Mn_{1.5}O_4$ cathode provided an average 2.8 V which shows near theoretical reversible capacity of 310 mAh/g, corresponding to a $Li_{1.84}Ti_2O_4$ stoichiometry. The observed capacity is the highest among all reported values for any form of $TiO_2$ anodes to date. In addition, in the same manner we obtained the first reversible metal oxide anode for sodium-ion batteries that also improves with cycling. The simplicity of the electrode design and the use of fast electrochemical cycling foster the ability for these materials to maximize their capacity in operando, opening a new avenue for synthesis of safe and durable high power/high capacity batteries.

The vanadium oxide embodiments of this invention are particularly suited for use in sodium-ion cells and batteries. The approach to achieving sodium intercalation is to use materials that have adjustable d-spacing and two-dimensional layered structure that can accommodate large volume changes. Furthermore, to facilitate reversible insertion of sodium ions, a host lattice that has short range order would be preferred to crystalline structures due to the conservation of low-entropic energy associated with ordering of intercalated atoms. The present invention provides, inter alia, electrochemically grown nanostructured bilayered vanadium pentoxide as a highly efficient 3 V cathode material for rechargeable sodium batteries. With capacity of 250 mAh/g, excellent rate capability and life cycle, as well as high energy density of 760 Wh/kg, this material can be used in advanced energy storage applications.

DETAILED DESCRIPTION OF THE PREFERRED EMBODIMENTS

The present invention provides new, more efficient electrode materials for lithium-ion and sodium ion batteries. In one embodiment, the present invention provides anodes for lithium-ion or sodium-ion batteries comprising a nanostructured amorphous titanium or vanadium oxide on a metallic substrate.

In one preferred embodiment the electrode comprises titanium dioxide nanotubes on a titanium metal (e.g., titanium foil) support. In another preferred embodiment, the electrode material comprises a bilayered V2O5 film on a metal (e.g., nickel) substrate.

Certain aspects and features of the present invention are illustrated by the following discussion, which is not to be considered as limiting.
Titanium Oxide Materials.

Herein, we explore a new approach of creating high capacity/high power electrodes starting from an amorphous, disordered nanoscale material. Recently, it has been shown that increased concentration of interfacial regions in amorphous materials may form percolation pathways for fast diffusion of ions. Our approach to forming new improved anodes is to take advantage of enhanced diffusion in amorphous materials. This allows for accumulation of a high local concentration of intercalated Li-ions at the reduced transition metal centers (i.e. $Ti^{3+}$). Ordering of densely packed materials henceforth would result in the formation of a crystalline structure that accommodates the highest concentration of Li ions, ensuring the highest possible electrode capacity.

We synthesized densely packed, vertically oriented amorphous $TiO_2$ nanotubes ($TiO_2NTs$) using electrochemical anodization of Ti foil. Electrochemical synthesis is a method of choice for preparation of nanoscale architectures that require electronic conductivity, and it eliminates the need for conductive carbon additives and binders typically used in electrodes that can alter their long-term stability. As the potential drives the electrons that are used to create reactive species, the chemical reaction propagates to the extent that electrons can penetrate the structure, fostering electrical connectivity. The ease of controlling the kinetic parameters of synthesis by simple manipulation of voltage and current density offers a great advantage in controlling size and shape of formed nanostructures. In addition, nanostructures have direct and electronic connection to a metallic current collector (e.g. Ti foil). As-synthesized $TiO_2NTs$ are amorphous, as determined by X-ray diffraction (XRD).

Figure 1:
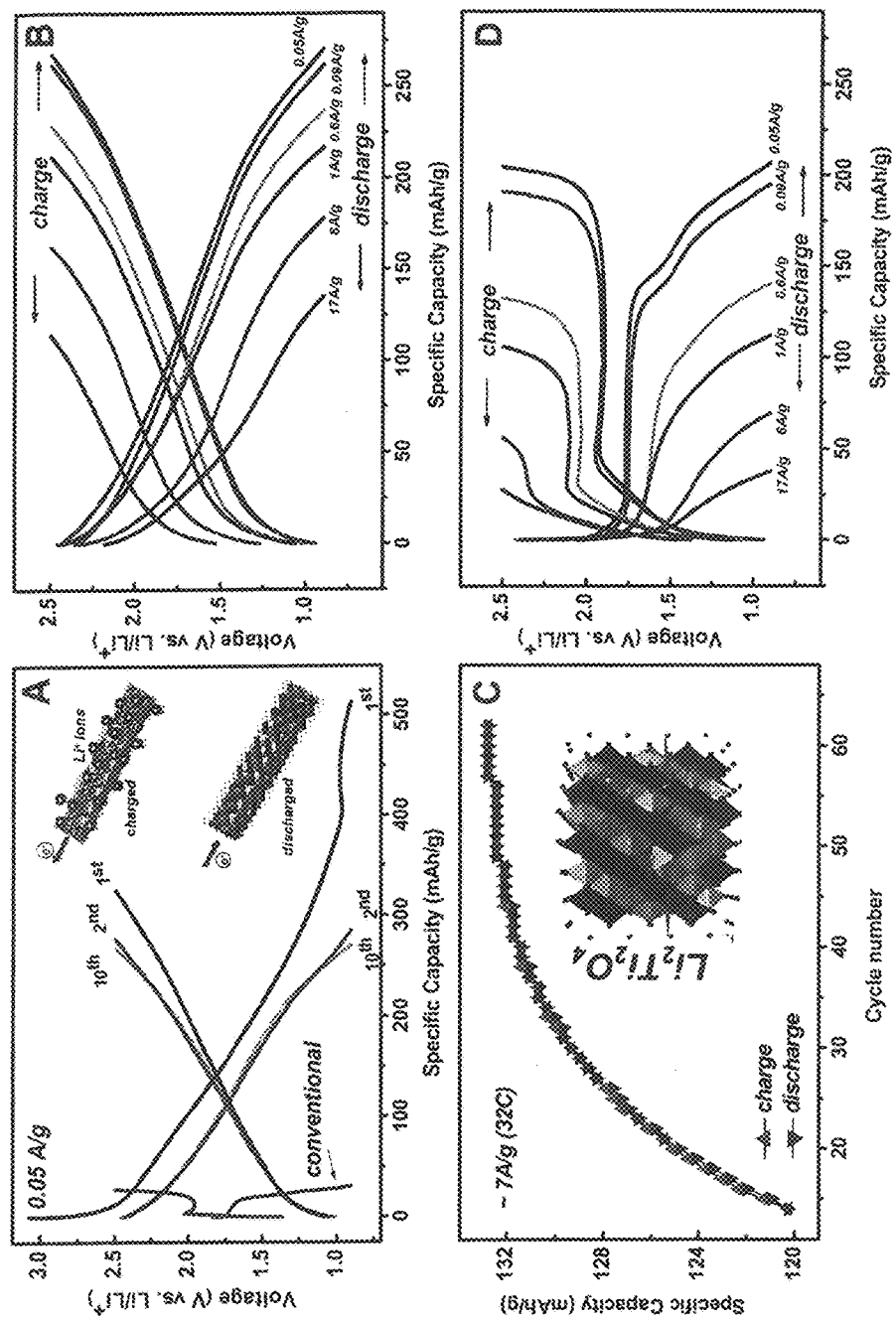
FIG. 1. Electrochemical characterization of $TiO_2NTs$ in the Li system. (A) Charge/discharge galvanostatic curves of amorphous 65 nm outer diameter (O.D.) $TiO_2NT$ and microcrystalline $TiO_2$ conventional electrodes mixed with binder and carbon black cycled between 2.5 and 0.9 V vs. $Li/Li^+$ at 0.05 A/g (approximately C/5, discharge the electrode in 5 hours). The process of Li-ion coupled electron diffusion in NT during charge and discharge is presented schematically where Ti octahedra are light gray and Li octahedra after intercalation are dark gray or black. Charge/discharge profiles of amorphous $TiO_2NT$ (B) and anatase $TiO_2NT$ (D) over a wide range of current densities cycled between 2.5 and 0.9 V vs. $Li/Li^+$. Note in amorphous $TiO_2NT$ (B) 17 A/g corresponds to approximately 140C (discharge the electrode in (1/140) h) and 0.05 A/g correspond to C/5 (discharge the electrode in 5 h). (C) Self-improving of amorphous $TiO_2NT$'s capacity with cycling at high rate (7 A/g, approximately 32C). Inset shows the crystalline structure obtained after cycling.

When amorphous $TiO_2NTs$ were used as electrodes in a lithium half-cell, a monotonic linear decreasing voltage is observed during the first discharge ($Li^+$ insertion), followed by a characteristic plateau at approximately 1.1 V vs. $Li/Li^+$. The existence of the plateau indicates a phase transition, implying that injected electrons do not contribute to decrease of the potential difference between electrodes but instead are consumed in the change of the structure of the materials with enhanced capacity for Li-ions (FIG. 1A). The phase transition to a new structure improves the capacity by an additional 125 mAh/g and occurs at a slightly lower potential than the one when transformation began. However, unlike a standard two-phase equilibrium phase transformation, after the first discharge, the shoulder characteristic of phase transition vanishes and a smooth sloping voltage/capacity curve indicative of solid-solution type intercalation develops. The capacity of the first charge ($Li^+$ deinsertion) corresponds to the theoretical capacity of 335 mAh/g, while an extraordinary high capacity of 520 mAh/g on the first discharge, previously observed in nanoparticulate $TiO_2$ electrodes, is a consequence of the consumption of Li atoms in reduction of surface OH groups and residual surface $H_2O$ after vacuum annealing at 110° C.

Figure 7:
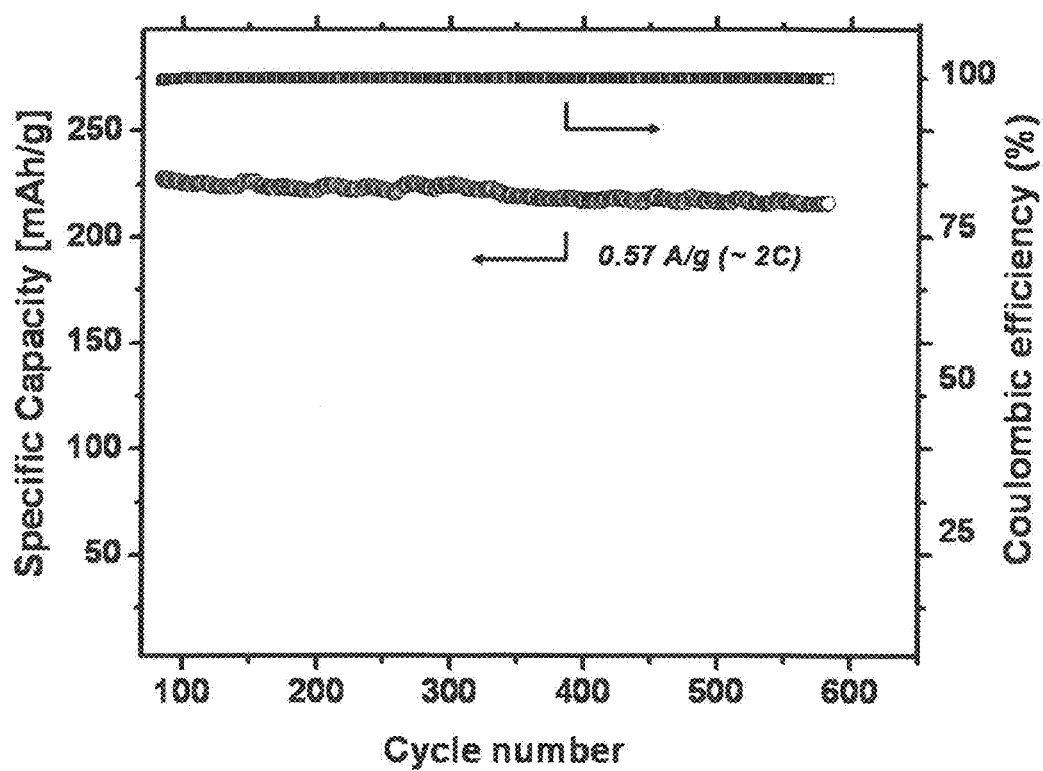
FIG. 7. Cycling performance of amorphous-to-crystalline $TiO_2NT$ electrode. The $TiO_2NT$ electrode had been cycled at a wide range of current densities prior to the cycle life test.

Further charge/discharge profiles do not show evidence of capacity loss or Coulombic inefficiency, and Li ions reversibly intercalate/deintercalate into $TiO_2NTs$ (FIG. 7). The specific reversible capacity following phase transformation becomes as high as 271 mAh/g at a rate of C/5 (C/n, discharge the sample in n hours) in a half cell (FIG. 1A), which is significantly larger than the highest capacities (170 mAh/g at room temperature) observed in previously investigated polymorphs of $TiO_2$ such as anatase or rutile. This value is also higher than the expected theoretical value of 250 mAh/g for the highest capacity polymorphs corresponding to the stoichiometry of $Li_{0.75}TiO_2$. Control experiments with conventional powdered anatase $TiO_2$ electrode also confirms that the $TiO_2NT$ electrode shows a surprisingly higher capacity (approximately 10 times) than the traditionally used microcrystalline electrodes assembled using electroactive binders and carbon black diluent (FIG. 1A) of comparable capacity reported in the literature.

It is surprising that the amorphous metal oxide electrode materials of the present invention exhibit high capacity on cycling, when conventional wisdom indicates that their collective electron orbitals are not expected to participate in conduction of charge within the electrode material. It is generally accepted that a large fraction of amorphous materials usually possess "dead" volume that adds weight and lowers the energy density of the battery. Our observation of high reversible capacity in amorphous nanotube electrodes that exceeds the theoretically predicted values for any of the $TiO_2$ polymorphs likely is the consequence of a different intercalation mechanism, different structure, or the presence of different intercalation sites in nanotube electrodes compared to traditional bulk electrodes. The rate capability study confirms superior diffusion of Li ions in these electrodes compared to anatase $TiO_2NT$ electrode obtained by annealing the same $TiO_2NT$ at 450° C. (FIG. 1B, D). This was especially apparent at high rate (17 A/g) when the high capacity of 135 mAh/g was preserved in charging amorphous $TiO_2NT$ within 26 seconds compared to the anatase NTs, having only 38 mAh/g. This capacity is comparable to the theoretical capacity (175 mA/g) of $Li_4Ti_5O_{12}$, which is considered as a promising safe alternative to graphite anode. Moreover, the capacity of the amorphous sample self-improved with cycling at fast rate (approximately 32 C) and its Columbic efficiency rose >99% even after fast charge-discharge cycles (FIG. 1C), while our similar experiments on anatase NT electrodes show a slight decrease of capacity in fast charge-discharge cycles. These results suggest that cycling of $Li^+$ into and out of the amorphous $TiO_2NT$ material initiates ordering of $TiO_2$ into a new type of material that is much better suited for electron conduction and intercalation of Li ions. This new phenomenon of self-improving amorphous materials can be a very attractive approach for the preparation of high performance electrode materials.

Figure 2:
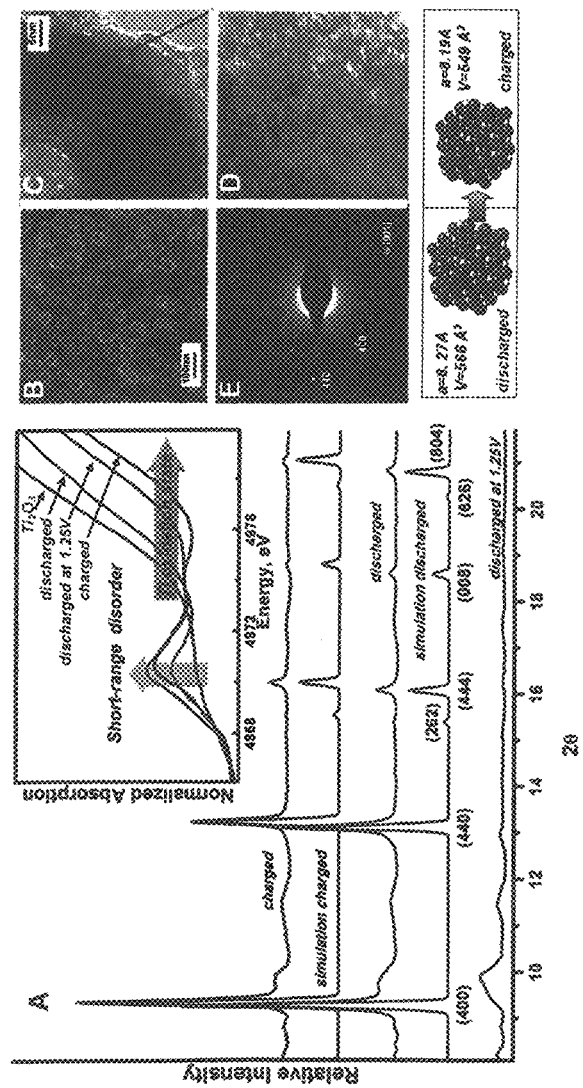
FIG. 2. Structural characterization of electrodes from amorphous $TiO_2NTs$ at different stages of cycling in Li cells. (A) Ex situ Synchrotron XRD measurements; at the stages of discharged to 1.25 V vs. $Li/Li^+$, discharged to 0.9 V, followed by charged to 2.5 V. Simulation of the XRD pattern with fcc structure (227 space group) is in agreement with the experimental pattern and demonstrates the change of the volume of the crystalline unit cell upon cycling, showing that the volume decreases for approximately 17 $Å^3$ as Li ions are reversibly removed from the lattice. All measurements were performed on 5 µm-long $TiO_2NT$ with 65 nm O.D. and 10-nm wall thickness. Simulation of XRD assumed the same sites occupied by Li and Ti atoms with 0.5 site occupancy Inset: pre-edge feature in the Ti K-edge X-ray Near Edge Structure (XANES) for the same samples. $T_2O_3$ XANES spectrum is shown for reference. SEM and TEM images of charged $TiO_2NTs$. (B) SEM image of charged $TiO_2NTs$ with 65 O.D. and 10-nm wall thickness after cycling. (C) individual nanotube after cycling having 10-nm wall thickness shown on HRTEM image. (D) HRTEM image at a region of the same tube shows fringes corresponding to a lattice spacing of 2.05 Å. (E) Selected area electron diffraction (SAED) confirms fcc structure and high crystallinity of $TiO_2NTs$ after phase transformation upon electrochemical cycling.

We used a combination of experimental and computational techniques to understand the atomic-scale features of this transformation. XRD synchrotron measurements were employed to investigate phase transition of the amorphous $TiO_2NTs$ during the process of cycling. Due to the high brilliance and the phase contrast, synchrotron XRD offers exceptionally high resolution in reciprocal space and sufficient sensitivity to probe even single layer atoms and therefore is ideal for investigation of nanoscale materials. We found that cycling amorphous $TiO_2NTs$ repeatedly above approximately 1.1 V, (the potential before phase transition occurs) produces materials with no significant improvement of crystallinity (FIG. 2A). However, cycling at potentials below the shoulder indicative of a phase transition results in the formation of a new crystalline material with high degree of symmetry. The spectrum can be fitted remarkably well with the face-centered-cubic (fcc) $Li_2Ti_2O_4$ crystalline phase (Fd$\bar{3}$m, space group 227) with lattice parameters that depend on the Li content. In this phase Li and Ti are randomly distributed among all octahedral sites in a nearly ideal cubic closed packed oxygen array that was previously obtained in a bulk form upon chemical treatment with n-butyl-lithium of the spinel $LiTi_2O_4$ phase. It should be noted that while XRD indicates development of a long-range order immediately after first discharge, a pre-edge feature in the Ti K-edge X-ray Near Edge Structure (XANES) (symmetry forbidden 1s-3d transition in Ti that gains intensity with decreasing centro-symmetry) shows that the structure does not develop short-range order expected for fully ordered octahedral system (FIG. 2A, inset). While the oxidation state of Ti in lithiated samples approaches that of $Ti_2O_3$, the short range order does not evolve. High-resolution transmission electron microscopy (HRTEM), and selected-area electron diffraction (SAED) images on the charged sample confirm long-range order. The HRTEM image (FIG. 2D) revealed a well-defined 2.05 Å crystal lattice spacing, which corresponds to the newly emerged (400) plane of the charged sample shown in the XRD spectrum. A SAED pattern viewed down the [001] zone axis on the tubes also indicated (400) and (440) crystal planes (FIG. 2E) indicative of a cubic phase.

Figure 8:
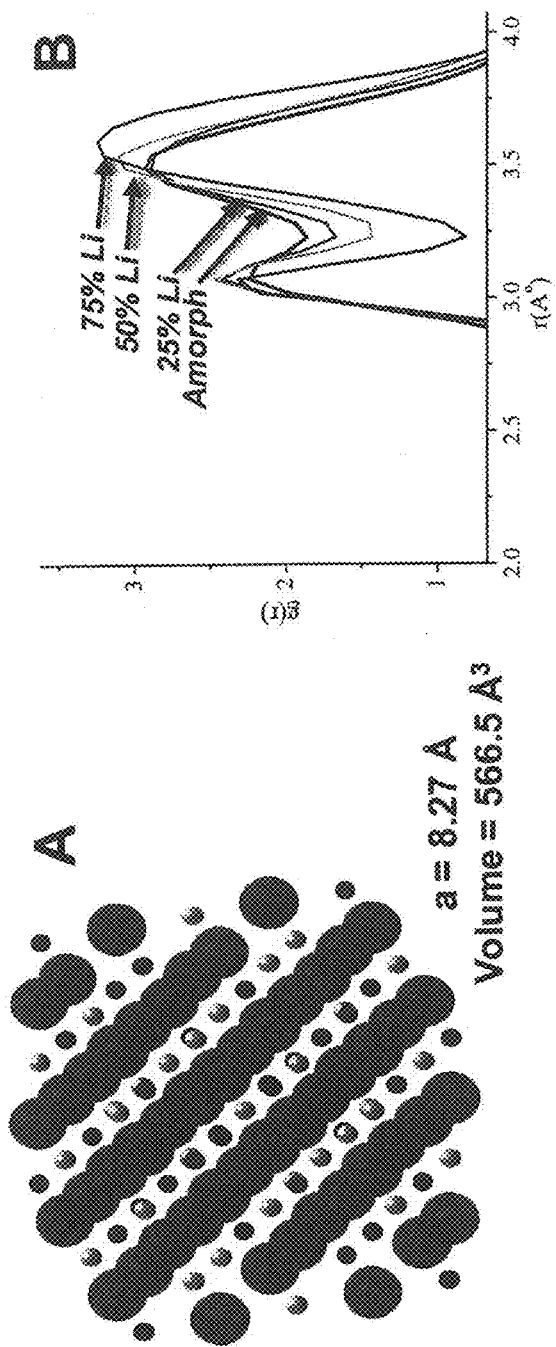
FIG. 8. DFT based geometric optimization shows that the self-improved cubic phase is thermodynamically stable with an optimized lattice constant approximately 8.27 Å, which is in good agreement with the experimental observation. (B) The radial distribution function showing the onset of localized ordering with increasing Li loading.

The cell parameter of the discharged unit cell of 8.27 Å, is somewhat smaller than the one previously reported for chemically prepared bulk $Li_2Ti_2O_4$ (a=8.376 Å) of the same symmetry, suggesting a good balance of electrostatic forces. Our geometric optimization using density functional theory (DFT) calculations gives an optimized lattice constant of 8.27 Å (FIG. 8A), in agreement with the experimental observation. The size of the unit cell of the charged sample is significantly smaller than that of the spinel phase $LiTi_2O_4$ (8.403 Å), suggesting that during de-intercalation, Li ions do not occupy tetrahedral sites that are generally taken in the spinel phase. Moreover, investigation of the samples at different stages of discharge shows a linear decrease of the crystal unit cell with decreasing content of Li, suggesting that there is no transition through a spinel phase, whereby Ti and Li form a solid solution between charged and discharged compositions. The small 3% volume change between discharged and charged state does not seem to affect morphology and long-term stability of $TiO_2NTs$, and the sample maintains the same capacity and unperturbed morphology (FIG. 4, 7) for >600 cycles (the extent of our measurement). Indeed, the continuous change of the lattice parameters and the sloping shape of the voltage curves after phase transformation are typical features of a solid-solution intercalation mechanism, leading to stable and reversible rechargeable batteries.

Molecular dynamics (MD) simulations suggest that atomic diffusivity in the lithiated amorphous $TiO_2$ structure depends strongly on the lithium content. The calculated diffusivity of Ti and O ions for 25% Li loading was significantly lower than that for 75% Li loading in the case of amorphous $TiO_2$. This kinetic fluidity in amorphous $TiO_2$ suggests that crystallization to the thermodynamically stable cubic phase of similar composition should be possible during initial discharge at longer timescales than are accessible to MD simulations. Once the cubic structure forms, atomic motion in the case of Ti and O is confined to localized vibrations, but the lithium mobility is very high.

Figure 10:
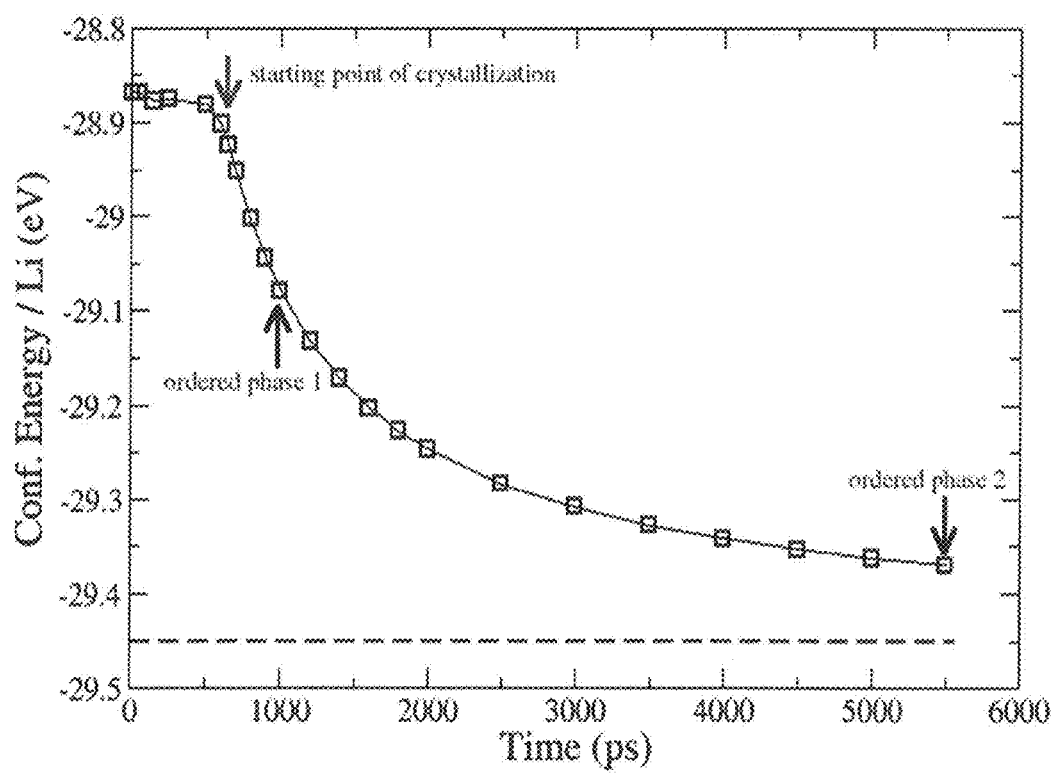
FIG. 10. Time evolution of the configurational energy of the 100% lithiated $TiO_2$ system.

We found that diffusion coefficients of Ti and O in amorphous $TiO_2$ having low concentrations of Li are fairly small, comparable to those in other titania polymorphs. This suggests that introducing low amount of Li should not produce any large-scale phase transformations. However, at high lithiation level (>75%), atomic diffusion of Ti and O becomes significant, suggesting facile rearrangement of atoms in the structure and leading to phase transformation. This rapid kinetic diffusion, in turn, suggests that crystallization to thermodynamically stable phases of similar composition should be possible during initial discharge of the $TiO_2$ electrodes. Our analysis of the formation energies also indicates that the cubic structure is energetically more favorable than amorphous titania with the same lithium loading (FIG. 10).

In order to further understand the evolution of crystalline structure we evaluate the dynamics of the phase transformation from amorphous to crystalline material occurring at high Li loadings, by performing MD simulations for the 100% Li loaded amorphous $TiO_2$ composition. These results indicate evolution of long-range order in highly lithiated $TiO_2$, as revealed by the formation of regularly ordered layers of oxygen. These well-defined layers of oxygen are separated by layers of mixed metal (Ti and Li) atoms that do not show short-range order but are randomly distributed between ordered oxygen arrays. We noted that this layered formation resembles the cubic phase observed in the experiments. The entire structure has long-range order while within the layers, disorder exists. Further simulations performed up to 6 nanoseconds (ns) do not show increase in short-range ordering, suggesting that the structure should possess stable long-range order but that short-range ordering is kinetically inhibited. It should be noted that the MD simulations also indicated that for Li concentrations much lower than 100%, the lithiated amorphous oxide maintains its disordered structure for the same time and temperature conditions (1400 and 1200 K), indicating that the kinetics of this transformation is strongly correlated to the $Li:TiO_2$ stoichiometry.

We believe that existence of long-range order in the absence of short-range order within layers (chemical disorder) is an important factor in the thermodynamic stability of the de-lithiated structure. The fact that, in this structure, all layers continue to contain metal atoms, even in the charged state, provides stability and prevents collapsing of the delithiated structure. Accordingly, our DFT calculations also show that the optimized structure for the fully de-lithiated titania preserves cubic symmetry.

Interestingly, previous reports of bulk fcc $Li_2Ti_2O_4$ suggest that this structure cannot be employed for reversible cycling. Chemically synthesized bulk cubic $Li_2Ti_2O_4$ can be oxidized to $Li_{0.1}TiO_2$, but removal of Li results in a defective disordered cubic structure that is virtually unreactive for further Li intercalation. On the other hand, nanoscale architectures obtained in this work by self-assembly of amorphous samples show entirely reversible Li insertion/extraction, demonstrating the existence of a solid solution mechanism and good coulombic efficiencies, and confirming facile diffusion of Li ions (FIG. 1A).

Figure 3:
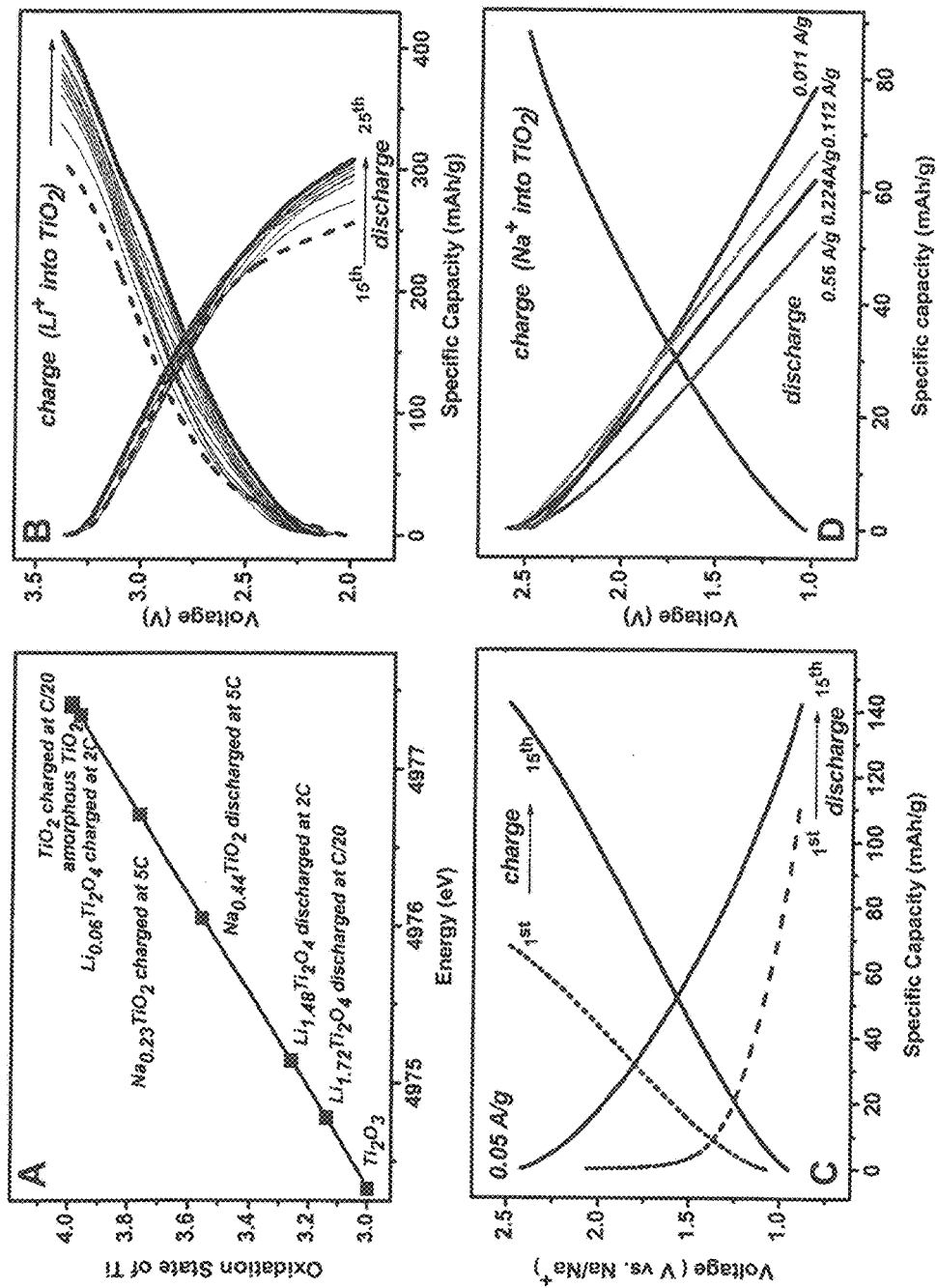
FIG. 3. Comparison of capacities of $TiO_2NT$ anodes in half (right) and full cell (left) using Li and Na transporting ions. (A) Capacity measured in terms of total number of stored electrons represented by Ti oxidation states in different charged/discharged states obtained from Ti K-edge XANES. The edge position of each sample is determined from the intercept of the main edge and pre-edge contributions. (B) Charge/discharge voltage profile of the $TiO_2NT$-$LiNi_{0.5}Mn_{1.5}O_4$ battery at ambient temperature at a rate of C/15 (C) Charge/discharge galvanostatic curves of amorphous 120 nm O.D. $TiO_2NT$ in Na half cell (red for discharge and black for charge) cycled between 2.5 and 0.9 V vs. $Na/Na^+$ at 0.05 A/g (C/3, discharge the electrode in 3 h). (D) Charge/discharge voltage profile of the $TiO_2NT$-$Na_{1.0}Li_{0.2}Ni_{0.25}Mn_{0.75}O_\delta$ battery at ambient temperature and various rates.
Figure 9:
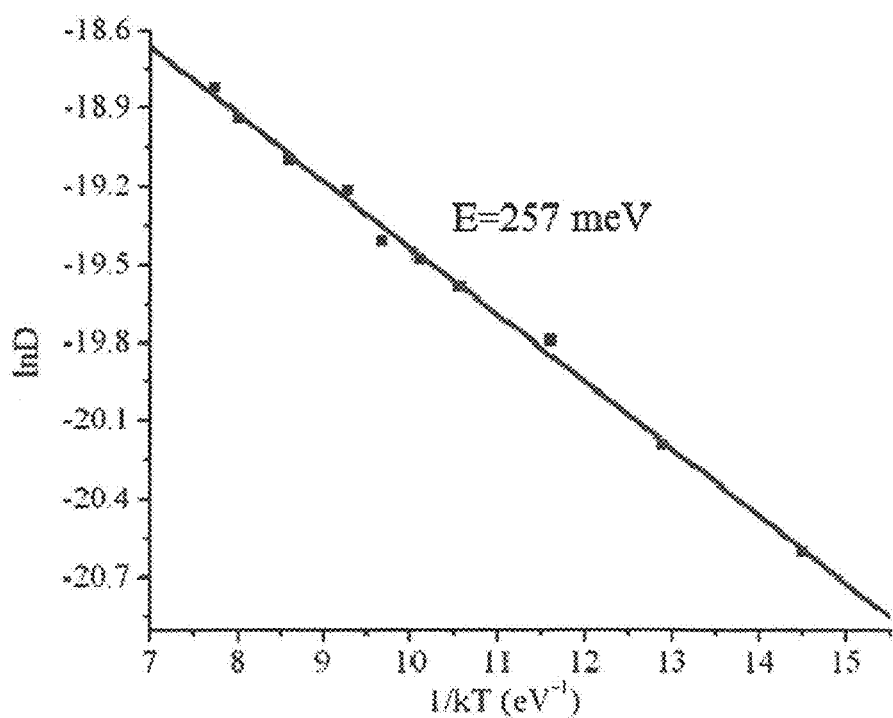
FIG. 9. Arrhenius plot for Li ion diffusion in cubic structure constructed from the results of 1 ns MD simulations.

To understand how the diffusion characteristics of lithium in the self-improved cubic structure compare with those in other titania structures, MD simulations of Li ion diffusion in a variety of highly lithiated crystalline and amorphous titania structures were performed, including amorphous and cubic $Li_2Ti_2O_4$, as well as anatase $TiO_2$. Comparison of the trajectories suggested that Li ion transport in fully lithiated samples follows cubic (100% Li)>amorphous (100% Li)>anatase (50% Li), which is consistent with the high reversible capacity observed for the self-improved structure as compared to other titania polymorphs. In fact, calculation of Li ion diffusion in the cubic $Li_2Ti_2O_4$ reveals a remarkably low diffusion activation barrier (257 meV—FIG. 9) implying that rapid lithiation and de-lithiation of the cubic 227 structures should be possible during successive discharge/charge cycles. This finding supports our XANES measurements that confirm commendable discharging/charging even at fast cycling rate (FIG. 3A). We note that the diffusion mechanism for Li ion transport can be significantly different for each of the above oxide structures. The diffusion mechanism in anatase is vacancy driven and occurs via zigzag hops between the octahedral sites, while Li ions bond with both Ti and O, and create a Li—Ti—O network in the amorphous $TiO_2$. The Li diffusion mechanism in the cubic structure that is identified from the MD simulations proceeds by simultaneous crossing of Li ions between Li-rich and Ti-rich rows in the cubic 227 crystal; suggesting that this elementary diffusion pathway is active during charge/discharge cycles. We note that these types of Li exchange processes are associated with low diffusion barriers, and are not possible in other crystalline titania polymorphs that lack this local geometry.

To demonstrate the practical significance of this material in batteries, the $TiO_2NT$ (cubic form) anode was coupled with a 5 V spinel ($LiNi_{0.5}Mn_{1.5}O_4$) cathode for testing in a Li-ion full cell configuration. The 5 V spinel was chosen as the cathode in order to maximize the cell voltage, and the cell was constructed such that the specific capacity is limited by the mass of anode material. The $TiO_2NT/LiNi_{0.5}Mn_{1.5}O_4$ cell shows an average cell voltage of 2.8 V and exceptionally good specific capacity that improves as the cycling proceeds. The success of this Li-ion cell made by $TiO_2NT$ anode demonstrates that it maintained the advantage of a Li-ion battery (large output potential) while it moved the operating potential at the anode to a higher window, thus avoiding possible safety hazards from Li plating. The discharge capacity of the cell improves with cycles and reaches approximately 310 mAh/g in less than 25 cycles (C/15 rate) (FIG. 3B), which is higher than any reported capacity based on $TiO_2$.

The success of the synthetic approach of this invention for Li suggests that the use of amorphous electrochemically synthesized 1D nanostructures for creating rechargeable batteries that utilize transporting ions other than Li, for example Na ions, thus presenting an unique opportunity to generate new classes of battery materials. Sodium is a cheap, nontoxic and abundant element that is uniformly distributed around the world and therefore would be ideal as transporting ion for alternative rechargeable batteries. However, to date, no low-voltage metal oxide anodes capable of operating with sodium ion at room temperature have been reported. The reason for this is likely the prohibitively large ionic radius of Na ion (1.02 Å) compared to the size of Li ion (0.76 Å), and therefore insertion of Na ion requires large distortion of the metal oxide lattice which would require unacceptably elevated temperatures not realistic for operation of batteries.

We applied the same method as for Li, i.e., the in situ electrochemically driven self-assembling approach at room temperature, in the presence of large concentration of Na ion. We find that, under electrochemical cycling conditions, narrow amorphous $TiO_2NTs$ do not incorporate sodium (e.g. 65 nm O.D. with 10 nm wall thickness). However, when larger tubes having 120 nm O.D. and 20 nm wall thickness are used as a host material, we again observe self-improving phenomenon, but in this case upon cycling at a slow rate (0.05 A/g, FIG. 3C). We found that in the first charge the capacity reaches 80 mAh/g at 0.9 V vs. $Na/Na^+$. Each subsequent cycle improves the capacity, and the average of the voltage/capacity curve and Columbic efficiency increased upon each cycle. However, the shoulder indicative of phase transformation during the first discharge cycle is not observed even when the samples were cycled to more negative potentials (<0.5 V). After 15 cycles the capacity reaches 150 mAh/g, corresponding to a stoichiometry of 0.6 Na/Ti.

The question that naturally arises is why Na ions do not insert into the smaller (65 nm O.D.) tube while Li ions do, and why the capacity in Na cells self-improves only under slow rate cycling while Li cell improves upon fast cycling.

Figure 11:
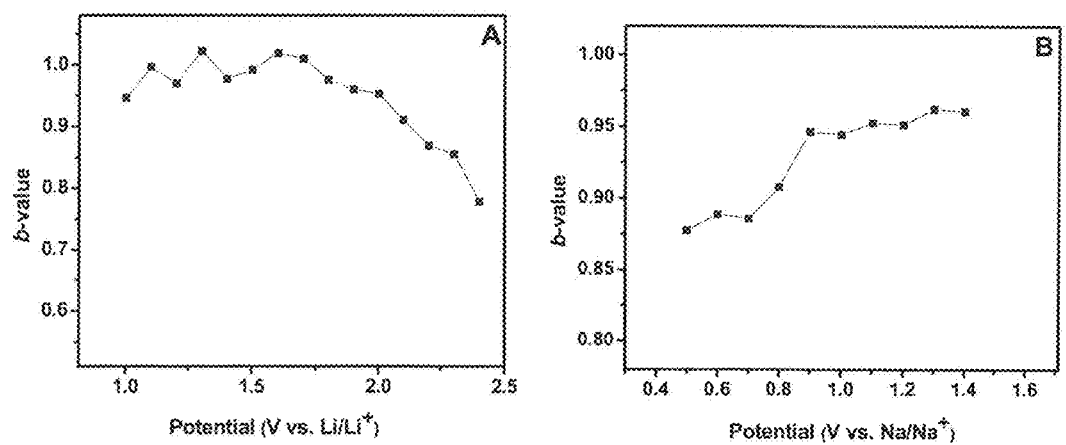
FIG. 11. b-values for $TiO_2NT$ electrodes as a function of potential for cathodic sweep (transporting ion insertion): (A) Li and (B) Na.

One of the possible reasons is relatively strong adsorption of Li ions on the $TiO_2$ surface in aprotic electrolyte solutions, while no adsorption was found for Na ions under the same conditions. This in turn enables a high local concentration of Li ions even in a small NT diameter, while Na ions remain mainly outside the NT in the bulk electrolyte. Upon injecting electrons into NT, Li ions from the surface are able to insert rapidly into the structure and induce phase transformation to high capacity structures that improves the performance of the cell even at high cycling rate (approximately 7 A/g). On the other hand, Na ions first need to diffuse through the electrolyte, adsorb on the surface of $TiO_2NTs$, and then insert into the $TiO_2NTs$ host material. In the larger NTs, however, a larger amount of electrolyte (and therefore Na ions) are trapped within the NT electrode compartment, enabling larger flux of Na ions upon discharge. As accumulation of Na ions at the electrode surface is slower compared to Li ions, capacity self-improvement of the $TiO_2NT$ should occur at a slower rate. Indeed we observe Na insertion at approximately 140 times slower rate of cycling (approximately 0.05 A/g) compared to Li ion. The same arguments also account for the different mechanism of cycling in Li and Na cells. The Li-ion cells operate via a diffusion mechanism at high potentials (2.4-1.8 V) where a small driving force is sufficient to insert adsorbed ions into the $TiO_2$ matrix. On the other hand, Na-ion electrodes at high potentials operate under a pseudocapacitive mechanism. At relatively negative potentials, a pseudocapacitative mechanism converts into diffusion mechanism (FIG. 11), indicating that critical concentration of Na ions in the vicinity of $TiO_2$ surface has to be reached in order for the insertion to begin.

Surprisingly, the $TiO_2NT$ materials also are suitable as anode materials for a Na-ion battery that can operate at room temperature. The Na-ion cell was made by a $TiO_2NT$ anode and a $Na_{1.0}Li_{0.2}Ni_{0.25}Mn_{0.75}O_\delta$ cathode. The cell shows an operation voltage of approximately 1.8 V and a discharge capacity of approximately 80 mAh/g (C/8) (FIG. 3D). The voltage is smaller compared to a Li-ion battery, but it is still higher than 1.2 V, the operation voltage of the nickel-metal hydride battery used as the power source for hybrid vehicles like Toyota Prius. In addition, this Na-ion cell comprised of a $TiO_2NT$ anode shows excellent rate capability with around 70% low-rate capacity retained at 11C. This Na-ion oxide battery therefore indeed holds promise for the further development of new ambient temperature Na-ion battery systems that combine novel electrodes to form full energy storage devices that are inexpensive with good performance.

It is at the nanoscale that near theoretical capacity and high power electrodes can be achieved using simple self-organization processes. The electrostatic attraction of electrochemically-altered materials provides a strong driving-force for the diffusion of a large concentration of transporting ions into amorphous metal oxide frameworks. This consequently leads to ordering of the atomic building blocks, transporting ions and host metal octahedra into a crystalline array. Inducing crystallization of nanomaterials in operando (i.e., in situ in a battery during charging and discharging) allows realization of the highest possible electrode capacity by optimizing the balance of electrostatic forces. The present invention demonstrates that much higher capacities can be realized if the system is naturally allowed to choose and optimize its crystalline structure through a process of self-organization and self-improvement. The small diffusion length and large surface area of nanostructures also enable exceptionally fast charging leading to high power batteries. Electrochemically induced structural evolution into high capacity/high power electrodes provides a powerful modular approach to the design of improved battery materials with programmable physical and chemical properties.

Synthesis of $TiO_2$ Nanotube Electrodes.

$TiO_2$ nanotubes were synthesized by electrochemical anodization. Pure titanium thin foil (0.0127 mm, 99.8%, Alfa Aesar) was cleaned by acetone following an isopropyl alcohol rinse before anodization. The back of the Ti foil was protected by nail polish to ensure uniform current distribution. The anodization was carried out in a two-electrode cell with Ti metal as the working electrode and a Pt mesh as the counter electrode under constant potentials (15-30 V) at room temperature using electrolytes of formamide with 0.8 wt % ammonium fluoride (Aldrich) and 5 vol % water. The as-anodized samples were ultrasonically cleaned in deionized (D.I.) water for 30 seconds. All amorphous $TiO_2NT$ samples were vacuum baked at 110° C. overnight before assembly in electrochemical cells. The crystallized $TiO_2NT$ samples were prepared by annealing as-prepared $TiO_2NT$ under $O_2$ at 450° C. for 4 hours.

Preparation of Positive Electrodes.

The $LiNi_{0.5}Mn_{1.5}O_4$ spinel and $Na_{1.0}Li_{0.2}Ni_{0.25}Mn_{0.75}O_\delta$-layered cathode materials were prepared by solid state reactions as follows: quantities of $Na_2CO_3$ and/or $Li_2CO_3$, and $Ni_{0.25}Mn_{0.75}CO_3$ (prepared by co-precipitation) to achieve the desired stoichiometry were ground together in an agate mortar until visually homogenous. The mixture was initially fired in a muffle furnace at 550° C. for 12 h, reground, and then calcined at 850° C. for 12 h and allowed to slowly cool to ambient temperature. Structures were verified by powder XRD and the relative metals contents were measured by ICP-OES and found to be the target compositions within the error of the determination. Electrode films were cast from slurries in N-methyl-2-pyrrolidone containing the active material at a concentration of about 82 percent by weight (wt %), carbon black (4 wt %, Cabot XC72), graphite (4 wt %, Timcal SFG-6), and poly (vinylidene difluoride) (10 wt %; Kynar KF1120) using doctor blade or spin casting techniques.

Electrochemical Insertion/Extraction of $Li^+$ and $Na^+$.

Li half-cells were assembled in coin-type cells (Hohsen 2032) with a Li metal foil as the negative electrode, microporous polyolefin separators (Celgard 2325), and 1.2 M $LiPF_6$ in ethylene carbonate/ethyl methyl carbonate (3:7 weight ratio) electrolyte (Tomiyama). Na half-cells were assembled in similar setup with a Na metal foil counter electrode, glass fiber separator (Whatman GF/F), and 1 M $NaClO_4$ (Aldrich) in propylene carbonate electrolyte. For comparison, a traditional laminate electrode was made by mixing 84 wt % active material (anatase powder, Aldrich), 4 wt % graphite (Timcal, SFG-6), 8 wt % poly(vinylidene difluoride) binder (Kynar), and 4 wt % carbon black (Toka). Half-cells were cycled galvanostatically at varying currents between 2.5 and 0.9 V vs. $Li/Li^+$ or 2.5 and 0.5 V vs. $Na/Na^+$ respectively using an automated Maccor battery tester at ambient temperature. Li-ion and Na-ion full-cells were assembled in the same manner as half-cells with a $LiNi_{0.5}Mn_{1.5}O_4$ cathode and a $Na_{1.0}Li_{0.2}Ni_{0.25}Mn_{0.75}O_\delta$ cathodes, respectively. Li-ion full-cells were cycled galvanostatically between 2 to 3.5 V. Na-ion full-cells were cycled galvanostatically between 1 to 2.6 V. Cyclic voltammograms of the cells were recorded in a Solartron 1470E Potentiostat/Galvanostat. Electrodes removed from cells for analysis were thoroughly washed with dry dimethyl carbonate (Aldrich) and allowed to dry under inert atmosphere. All cell assembly and disassembly operations were performed in a He-filled dry glove box (oxygen level <2 ppm). The net weights of the TiO$_2$ nanotube films were obtained by peeling off the nanotube film from Ti substrate using adhesives and checking by SEM to make sure no residual TiO$_2$ nanotube is left on the substrate.

Synchrotron XRD.

X-ray diffraction measurements were performed at beamline 13-ID-D of GSECARS at the Advanced Photon Source (APS) at Argonne National Laboratory. The X-ray beam (37 keV energy, corresponding to X-ray wavelength of $\lambda=0.3344$ Å) was focused to a 2 µm diameter spot with a Kirkpatrick-Baez mirror system. The distance and tilting of the MAR165-CCD detector were calibrated using a CeO$_2$ standard. Charged TiO$_2$NT samples were prepared by stripping nanotube films from Ti support onto Kapton tape and sandwiching with additional Kapton tape. Electrochemically lithiated TiO$_2$NT samples were scratched-off and sealed inside a 3 mm-diameter hole in a piece of aluminum foil by sealing Kapton sheet to the foil using epoxy. All procedures were carried out in a He atmosphere glove box. Simulations of XRD patterns were carried out using CrystalMaker software (CrystalMaker Software, Ltd.).

Electron Microscopy.

Scanning Electron Microscopy (SEM) images were recorded with a JEOL JSM-7500F Field Emission SEM operating at 30 kV. High resolution electron transmission microscopy (HRTEM) images and electron diffraction (ED) were obtained using an FEI Tecnai F30 microscope equipped with a field emission gun operated at 300 kV. TEM samples were prepared by scratching cycled TiO$_2$NT samples from Ti support onto a carbon-coated copper TEM grid (ultrathin carbon film on a perforated carbon support film, 400 mesh, Ted Pella Inc.).

Molecular Dynamics (MD) and DFT Simulations.

MD simulations were performed using the DLPOLY MD package and electronic structure calculations were within Vienna ab-initio simulation package (VASP). The MD simulations utilized the shell potential model in which the polarizable ion consists of two particles—core and shell—that share the ion's charge and are connected via a spring constant. The atoms were treated as point particles, and interact via long-range Coulomb forces and short-range interactions. The short-range interactions were represented by the Buckingham potential, which is described by parameterized functions fitted to reproduce the structure and energetics of Li—Ti—O system. In all MD simulations, a system size of 4320 atoms was used. The calculations spanned a temperature range of 850 K-1400 K, and statistics typically were collected from 1 ns simulations with a time step of 0.2 femtoseconds (fs). DFT calculations were performed using GGA-PBE. The cubic structure was made of 64 atoms, while the amorphous cell was constructed using 96 atoms. The initial structure of the amorphous cell for DFT calculations was obtained from the equilibrated configurations generated from the MD simulations. At least three different amorphous configurations were simulated to ensure that the results were not biased by the initial starting configuration. For all the systems, the cell shape was allowed to change, and ions were allowed to relax. The calculations were performed using 550 eV energy cut-off and 5×5×5 k-point sampling.

X-ray Absorption Near Edge Structure.

X-ray spectroscopy measurements were performed at the PNC/XSD bending magnet beamline (20-BM-B) of the APS at Argonne National Laboratory. Measurements at the Ti K-edge were performed under transmission mode using gas ionization chambers to monitor the incident and transmitted X-ray intensities. A third ionization chamber was used in conjunction with a Ti-foil standard to provide internal calibration for the alignment of the edge positions. The incident beam was monochromatized using a Si (111) double crystal fixed exit monochromator. Harmonic rejection was accomplished using a Rhodium coated mirror. The charged samples were prepared by stripping NT films onto Kapton tape. The discharged samples were stripped onto Kapton tape in a dry glove box under a helium atmosphere and attached to a He-filled, sealed holder. The reference standards were prepared by spreading thin, uniform layers of powders on Kapton tape and stacking a few layers to attain the desired absorption step height. Each spectrum was normalized using data processing software package IFEF-FIT. Alignment of each sample reference spectrum with respect to Ti standard spectrum was within the range of ±0.03 eV.

Electron Paramagnetic Resonance.

EPR measurements were performed on a Bruker Biospin Elexsys E 580 at ANL. The instrument was operated at a frequency of 9.3 GHz with a modulation frequency of 100 kHz. The field was swept at 3.5 Gauss/s over 300 to 1500 G range. The calibration of the g-values was done with DPPH. The Li content in charged samples was calculated by integrating the area under the EPR curve.

Structural Parameters for Different TiO$_2$NTs

The volume of the unit cell expands slightly (approximately 1%) with cycling from 1st to 582nd cycle. The extent of lattice expansion between charged and discharged samples was less pronounced in the larger NTs (120 O.D. with 20 nm wall thickness) and volumes ranged between 562 to 557 Å$^3$ (Table 1).

TABLE 1

| Size | | | | Unit cell | |
|---|---|---|---|---|---|
| Tube length (µm) | O.D. (nm) | Wall thickness (nm) | Cycle (state) | a(Å) | Cell volume (Å$^3$) |
| 2 | 65 | 10 | 1(charged) | 8.19 | 550 |
| 2 | 65 | 10 | 172(charged) | 8.22 | 555.6 |
| 2 | 65 | 10 | 582(charged) | 8.22 | 555.6 |
| 3 | 120 | 20 | 172(charged) | 8.25 | 562 |
| 3 | 120 | 20 | 172(discharged) | 8.23 | 557 |

Size Effect of TiO$_2$NT Array Electrodes.

TiO$_2$NT electrodes were prepared with varying size and their specific capacities were compared in Table 2. It has been observed that capacity decreases with the increase of the tube length. This can be understood as being due to an increase in ohmic resistance along the tube length, leading to decreased capacity. The capacity of larger NTs (120 O.D.) was enhanced indicating that the diffusion of Li ions into larger tubes was more efficient possibly due to the larger amount of ions in larger NTs.

TABLE 2

| Size | | | Capacity (mAh/g) | |
|---|---|---|---|---|
| Tube length (µm) | O.D. (nm) | Wall thickness (nm) | Amorphous | Annealed |
| 2 | 65 | 10 | 271 | 210 |
| 3 | 65 | 10 | 170 | 145 |
| 5 | 65 | 10 | 150 | 105 |
| 3 | 120 | 20 | 191 | |

Figure 4:
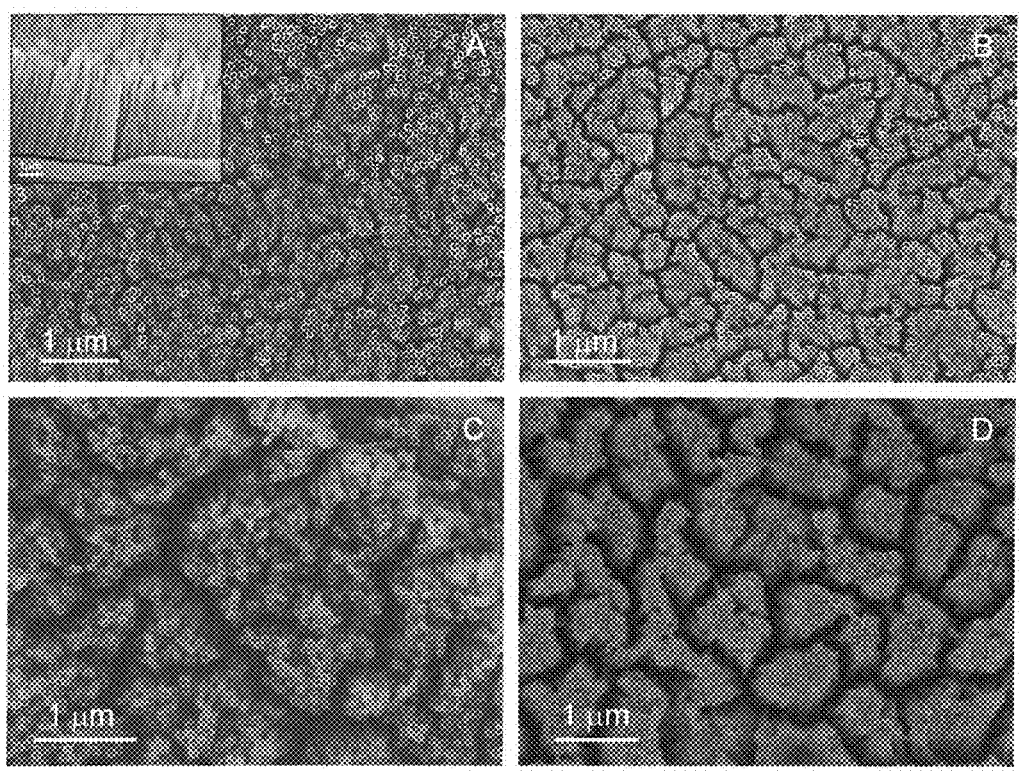
FIG. 4. SEM images of $TiO_2NT$ electrodes: amorphous $TiO_2NT$ (A) before, and (B) after cycling; annealed $TiO_2NT$ (C) before, and (D) after cycling. Inset in (A): cross-sectional image of $TiO_2NT$.
Figure 5:
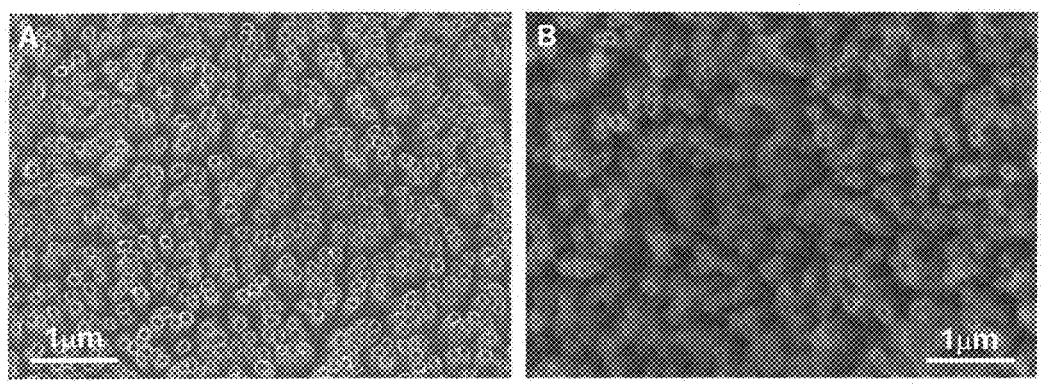
FIG. 5. SEM images of $TiO_2NT$ electrodes: amorphous $TiO_2NT$ (A) before, and (B) after cycling in Na system.
Figure 6:
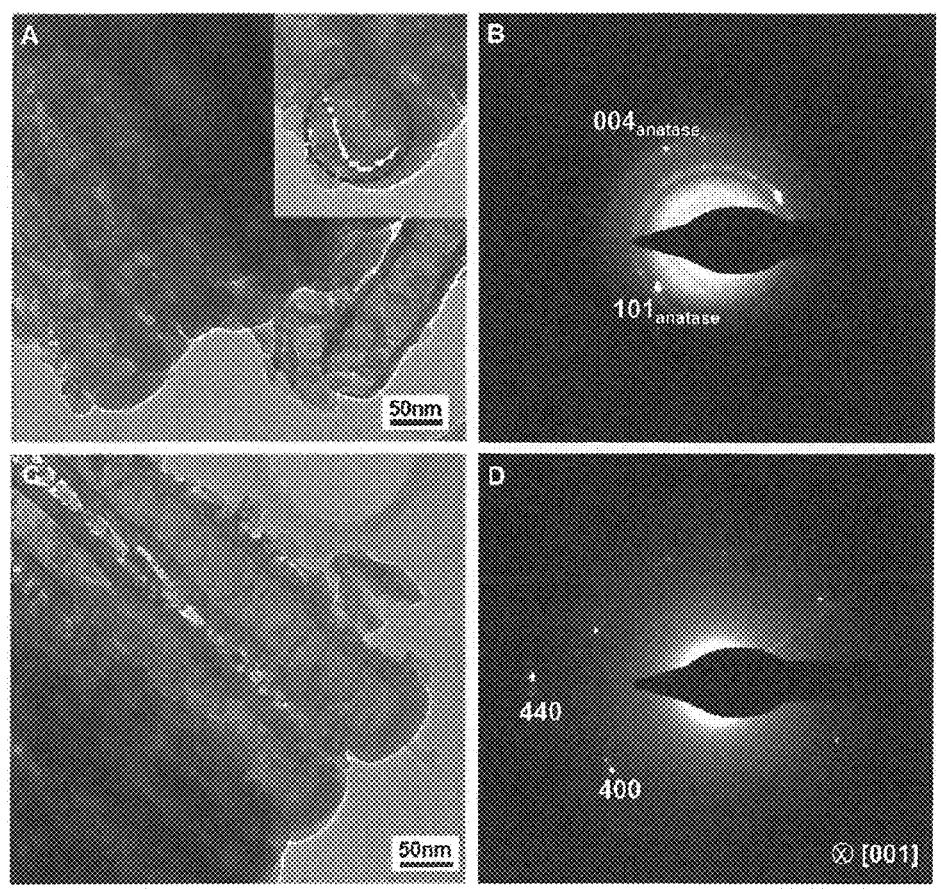
FIG. 6. HRTEM images of $TiO_2NT$ electrodes: (A) amorphous $TiO_2NT$ before cycling, inset: area showing area from the same $TiO_2NT$ after electron beam irradiation for 10 s. (B) SAED pattern from the area circled in the inset of (A), (C) HRTEM image of amorphous $TiO_2NT$ cycled with Li. (D) SAED pattern from the cycled $TiO_2NT$.

Characterization of Morphology.
1) SEM Characterization.
   a. Li system.
   SEM images of both amorphous and annealed TiO$_2$NT electrodes before and after electrochemical cycling in Li system are shown in FIG. 4. The nanotube morphology remained intact, indicating high mechanical strength of this material due to the unique nano-size effect.
   b. Na System.
   FIG. 5 shows SEM images of TiO$_2$NT electrodes before (A) and after (B) cycling with Na. The TiO$_2$NT material maintained nanotube morphology after cycling. It should be noted that the debris on the cycled tubes is from residues of electrolyte.
2) TEM Characterization.
   FIG. 6A, C compares the HRTEM images of amorphous TiO$_2$NT electrode before and after cycling. It can be observed that the morphology of the nanotube preserved after the electrode was cycled at a wide range of current densities. Interestingly, when TEM e-beam was focused on the amorphous (before cycling) TiO$_2$NT with the highest magnification (1M) and the smallest size (2 nm) for 10 seconds, the TEM image and the ED pattern (FIG. 6B) showed that the nanotubes were locally crystallized to form anatase crystal structure, which is different from the structure after electrochemical cycling (FIG. 6D). We also carried out post-annealing of the cycled TiO$_2$NT at 450° C. for 4 h, after which the XRD pattern shows a mixture of anatase, rutile and the cubic phase. This indicates that the newly formed fcc structure of TiO$_2$NT upon cycling was also thermodynamically stable.

Cycle Life.
   The cycle life of amorphous TiO$_2$NT sample in Li system was evaluated by electrochemically cycling for more than 500 cycles at approximately 0.6 A/g (2C) in a potential range of 2.5-0.9 V vs. Li/Li$^+$. It has been found that this material has excellent cycling stability with approximately 95% retention of capacity and close to 100% columbic efficiency (FIG. 7).

Charge Storage Behavior for TiO$_2$NT: Capacitive Vs. Diffusion Processes.
   The charge storage behavior of TiO$_2$NT electrodes in Li and Na systems were studied using cyclic voltammetry under different scan rates (0.1-5 mV/s) with Li or Na metal serving as both counter and reference electrodes. There can be three contributions to charge storage: the faradaic contribution due to the intercalation of transporting ions (Li$^+$, Na$^+$); faradaic contribution from surface processes, referred to as pseudocapacitance; and non-faradaic contribution due to the double layer capacitance. Contributions to the charge storage mechanisms can be characterized by analyzing the cyclic voltammograms with varying scan rates according to:

$$i = av^b \quad (1)$$

where measured current i obeys a power law relationship with scan rate v. Both a and b are adjustable parameters and b can be determined from plotting log(i) versus log(v). For a process limited by diffusion, b would be 0.5 according to the following equation:

$$i = nFAC^* D^{1/2} v^{1/2} \left(\frac{\alpha nF}{RT}\right)^{1/2} \pi^{1/2} \chi(bt) \quad (2)$$

where n is number of electrons involved in the electrode reaction, F is faraday constant, A is the surface area of the electrode material, C* is the surface concentration, D is the diffusion coefficient, v is the scan rate, R is the gas constant, α is the transfer coefficient, T is the temperature, and χ(bt) is the normalized current for a totally irreversible system in cyclic voltammetry. For a purely capacitive process, b is normally 1 according to the following equation:

$$i_c = vC_d A \quad (3)$$

where $C_d$ is the capacitance.
   For charge storage in Li system with TiO$_2$NT (FIG. 11A), the increase of b values in the potential range from 2.3 to 1.8 V indicates the switch of dual contributions from diffusional and capacitive mechanisms to a capacitive process dominated the mechanism. On the other hand, the opposite phenomenon was observed in Na system (FIG. 11B) with capacitive-limiting mechanism changing to mixed contributions by diffusion and surface capacitive processes when discharging proceeds.

Figure 12:
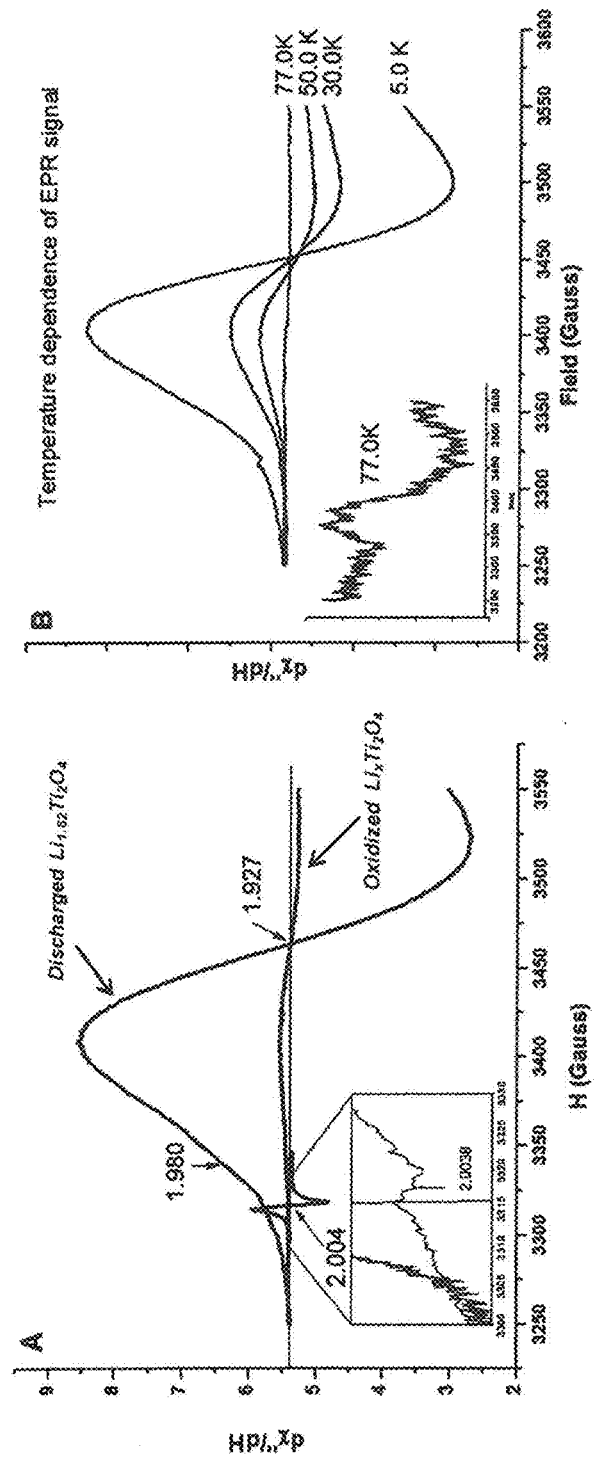
FIG. 12. EPR spectra: (A) Discharged sample has three features with g values 2.004, 1.980 and the strongest signal at 1.927. The resonance response of the discharged sample is power dependent. The sample was then exposed to air in order to remove excess electrons and measured under the same conditions. The surface under the integrated spectrum of oxidized sample is 27 times smaller than that of discharged sample. Weak pitch spectrum is shown in blue for the reference. (B) The sample warmed at 77 K shows very weak EPR spectrum with the resonance at 1.928 shifted towards the g-tensor of free electron to g=1.970. Upon cooling the resonance shifts back to its original value indicating localization of charges at liquid helium temperatures.

EPR Study.
   EPR measurements (FIG. 12) were performed on a Bruker Biospin Elexsys E 580 instrument operated at a frequency of 9.3 GHz with a modulation frequency of 100 kHz. The field was swept at 3.5 G/s over 300 to 1500 G range. The calibration of the g-values was done with DPPH. The microwave power shown on the spectra was 2 mW and modulation amplitude 5 G. The Li content was calculated by integrate the area under the curve.

Figure 13:
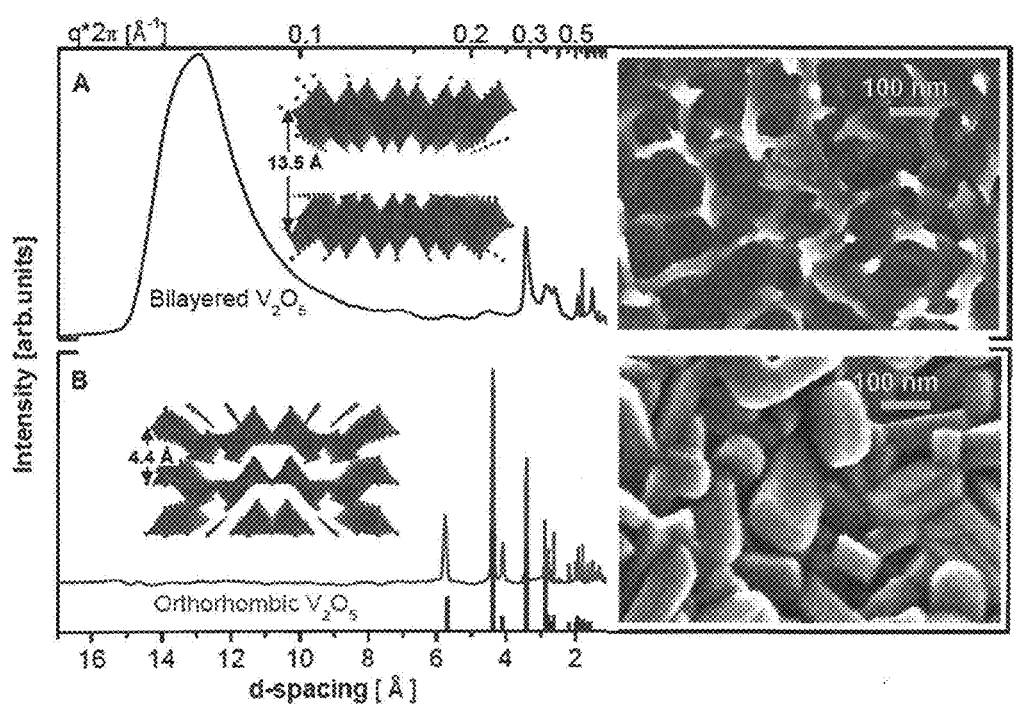
FIG. 13. Synchrotron X-ray diffraction, Scanning Electron Microscopy and molecular simulations of electrodeposited vanadium oxide: (A) bilayered $V_2O_5$ annealed in vacuum at 120° C., and (B) orthorhombic $V_2O_5$ annealed in oxygen at 500° C. In each case $V_2O_5$ was deposited at an anodic current density of 5 $mAcm^{-2}$. Bottom line-spectrum represents standard XRD of orthorhombic $V_2O_5$, JCPDS card #001-0359.
Figure 18:
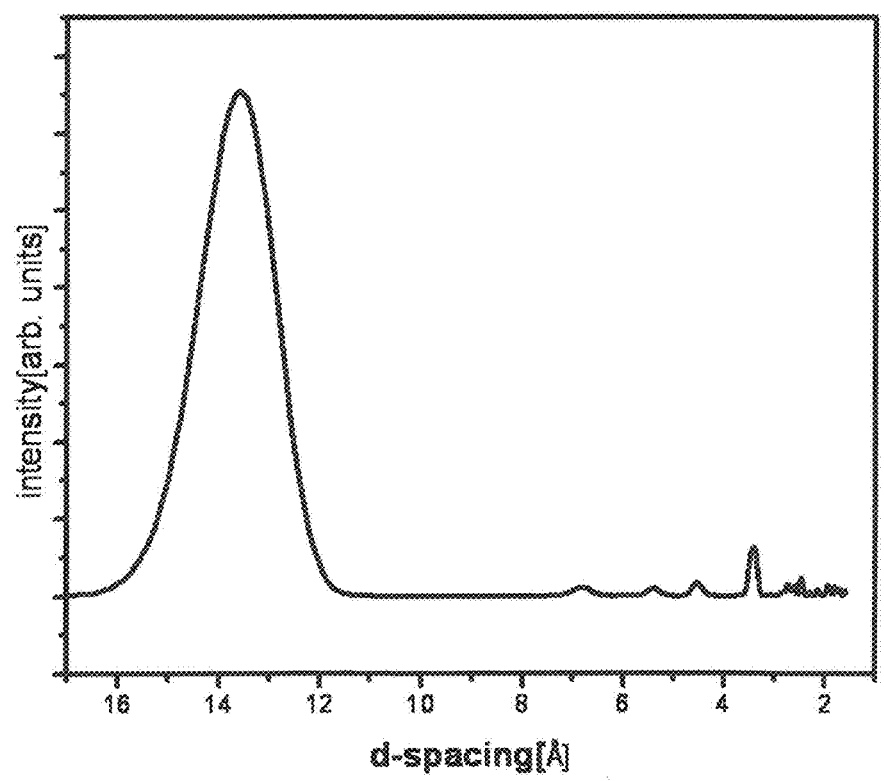
FIG. 18. Model of bilayered structure using monoclinic C 2/m crystal symmetry with 11 nm domains of crystallinity with lattice parameters a=11.68 Å, b=3.64 Å and c=13.69 Å and its corresponding simulated XRD pattern.

Vanadium Oxide Materials.
   Vanadium pentoxide was synthesized by electrochemical deposition from the aqueous vanadyl sulfate electrolyte on a metal foil substrate, e.g., a Ni foil substrate, and then annealed in vacuum at 120° C. to remove intercalated water. Electrochemically synthesized electrodes offer long-range electronic conductivity, which improves responsiveness to applied potential, and therefore, their intercalation properties. Utilization of electrochemical deposition also brings high level of control to the structure, morphology, and uniformity of electrodes by adjusting the crucial parameters such as: applied current, potential and electric pulses, as well as the temperature and concentration of the electrolyte. In addition, vanadium oxide electrode is deposited directly on a current collector without the use of electronic conductor (such as carbon black or nickel powder) and/or a polymer binder (such as polyvinylidene difluoride).
   Based on the scanning electron micrograph (FIG. 13 top right), such V$_2$O$_5$ electrode is found to be composed of nanoribbons with highly porous structure. The electrochemically grown interconnected ribbons allow excellent electron conductivity, while the high porosity enables efficient penetration of the electrolyte and ensures high utilization of electrode material. The electrode with such morphology represents an efficient matrix for ion transport in which high surface area of electrode diminishes limitations caused by diffusion.
   The result from synchrotron X-ray diffraction (XRD) (FIG. 13A) indicates that V$_2$O$_5$ structure is composed of 2D bilayered stacks indicated by narrow features in the intermediate and low d-spacing range of the diffractogram. These bilayered stacks are separated by large interlayer spacing, which is shown as an intense broad peak at high d-spacing (approx. 13.5 Å). The pattern contains a small number of Bragg-like features, indicating the presence of intermediate range ordering and a pronounced diffused component. The bilayered V$_2$O$_5$ is reminiscent of the V$_2$O$_5$ xerogels in which monoclinic bilayers of V$_2$O$_5$ stack up with the spacing that expands (or contracts) as the xerogel incorporates (releases) water molecules. This structure is a stacking of V$_2$O$_5$ bilayers made of base-faced square pyramidal $VO_5$ units arranged in parallel at equidistant positions (model in FIG. 13A). The distance of closest approach between the bilayer stacks is approximately 13.5 Å. This is the most noticeable period of repetition in the structure as manifested by the strength and position of the low-angle peak in the XRD pattern. The width of this feature suggests that stacking sequence is imperfect, confirming disordering in this system. The high-angle domain region is dominated by one peak at 3.44 Å, which is also the highest intensity peak in the simulated diffraction of monoclinic bilayered model structure and corresponds to combined diffraction of 201 and 111 directions composed of 2.85 Å apart single layers (FIG. 18).

When electrochemically grown $V_2O_5$ is annealed in oxygen atmosphere at 500° C., SEM image revealed that nanoribbons were converted to fine rod-like shape that exhibit orthorhombic crystalline structure (FIG. 13B). Based on diffraction patterns and simulated model structure the orthorhombic phase is consisted of single layers of $VO_5$ square pyramids, while the interlayer spacing in z direction is almost completely diminished compared to bilayered $V_2O_5$ reaching only 4.4 Å.

Considering these findings, the crucial question is which one of these structures supports better the reversible intercalation of sodium transporting ions. While bilayered structure is atomically ordered only in a short range, the spacing between bilayers is more random. However, there is a lot of void space between randomly spaced bilayers after removal of intercalated water, which, if flexible enough, can readjust the spacing to enable intercalation of larger Na+ ions (model, FIG. 13A,). On the other hand, orthorhombic rod-like crystals have long range order that may enable unhindered diffusion of intercalated ions throughout the entire structure that could lead to highly reversible capacity.

In order to evaluate functionality of these materials, each type of structure is formed on the separate electrode and they were submitted to cycling against sodium metal electrode (FIG. 14A). Both electrodes exhibited observable capacities, however, the bilayered $V_2O_5$ electrode demonstrates higher electrochemical activity and stable reversible capacity on repeated cycling than its orthorhombic counterpart. In the 3.8 to 1.5 V range, we observed significantly large specific capacity of 250 mAh/g at 20 mA/g (C/8; C/n, discharge rate in n hours) for bilayered $V_2O_5$ electrode compared to only 150 mAh/g for orthorhombic-$V_2O_5$. The high capacity of bilayered $V_2O_5$ is comparable to the theoretical limit of 236 mAh/g for $Na_2V_2O_5$, suggesting that this structure can accommodate one Na+ ion for each V atom.

The cycling curve is composed of two distinct parts: the first with a smooth slope indicative of solid solution intercalation mechanism that reaches about 235 mAh/g (theoretical capacity), and the second one at potentials >2.25 V when the slope changes to a steep curve indicative of capacitative mechanism. This small contribution of 15 mAh/g might be due to the capacitance of the surface layer or due to the presence of small amount of NiO formed at the interface between $V_2O_5$ and Ni substrate during the electrochemical deposition. Moreover, the shape of galvanostatic curves in FIG. 14A reveals entirely different mechanism of intercalation of Na+ transporting ions in two different $V_2O_5$ structures. Incorporation of Na+ ions into orthorhombic electrode is accompanied by two phase transitions, manifested by existence of two plateaus both in the discharge and charge cycles suggesting that orthorhombic crystalline structure changes twice to accommodate increasing Na+ concentration. On the other hand, the incorporation of Na+ ions into bilayered structure shows smooth, solid states solution intercalation with no phase transitions. Importantly, the capacity of bilayered $V_2O_5$ does not change with cycling including the first cycle. This behavior indicates that there is no side reactions of injected electrons with either electrolyte or surface of nanocrystalline bilayered $V_2O_5$.

In contrast, the capacity of orthorhombic electrode rapidly decreases with cycling, as previously reported. The phase transformation in orthorhombic crystalline electrode is less pronounced as the cycling proceeds concomitantly with the decrease of the electrode capacity. This behavior suggests that the change in crystalline structure is associated with the fading of the orthorhombic electrode performance. Indeed, examination of XRD patterns with cycling reveals that orthorhombic $V_2O_5$ experienced deterioration in its crystallinity after first 10 cycles, which is followed by loss of crystallinity after prolonged cycling (FIG. 14B). After 82 cycles the broadening and disappearance of the peaks, especially in longer d-spacing range (>4 Å), shows significant reduction of the crystalline domains from a few hundred to only few nm. Reduction of the domains of crystallinity is accompanied with loss of the electronic conductivity that directly causes loss of electrode capacity.

On the other hand, bilayered $V_2O_5$ electrodes were stable to repeated cycling and during prolonged galvanostatic cycling (up to 350 cycles) at high current density of 630 mA/g, and the average capacity of bilayered $V_2O_5$ electrodes remains at 85% of its initial value (FIG. 14C). Furthermore, nanostructured bilayered $V_2O_5$ electrodes exhibited excellent discharge capacity and cycle stability even at high-rate charge-discharge processes, e.g., the discharge capacity at faster cycling rate of 60 mA/g decreases slightly to 200 mAh/g, while at rate of 630 mA/g (6 min discharge) decreases to 150 mA/g.

Figure 14:
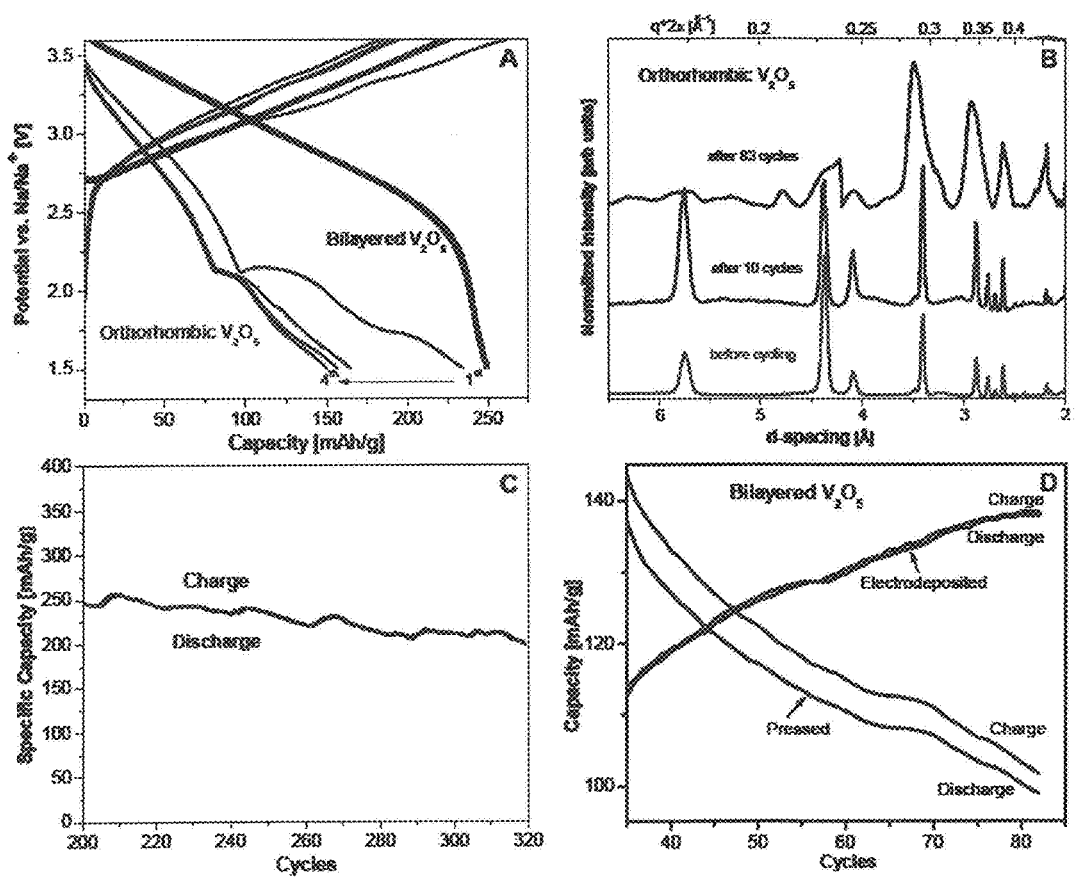
FIG. 14. (A) First five charge-discharge cycles of bilayered $V_2O_5$ and orthorhombic $V_2O_5$ electrodes. Both cells were cycled at 20 mA/g, within the potential window of 3.8-1.5 V (vs. Na/Na+) from 1 M $NaClO_4$ in PC. (B) Ex situ synchrotron x-ray diffraction patterns of orthorhombic $V_2O_5$ before and after cycling with Na-ions: after 10 and after 83 cycles. All films were deposited at an anodic current density of 5 mA $cm^{-2}$. (C) Capacity retention and Coulombic efficiency of bilayered $V_2O_5$ electrodes after first 350 cycles. (D) Cycle performance comparison of same electrochemically grown bilayered $V_2O_5$ film: deposited on Ni substrate and pressed on stainless steel mesh current collector. Both cells were cycled at 630 mA/g, within the potential window of 3.8-1.5 V (vs. Na/Na+) from 1 M $NaClO_4$ in propylene carbonate (PC).

FIG. 14D compares charge-discharge performance at fast cycling (630 mA/g) of bilayered $V_2O_5$ prepared electrochemically versus mechanically pressed on stainless steel mash. Interestingly, bilayered electrode that is electrochemically grown on Ni substrate shows improvement of the electrode capacity with the cycling (FIG. 14D) most likely due to improved supply of Na+ ions through nanoporous electrode. For comparison, when bilayered $V_2O_5$ was pealed from Ni substrate, mixed with conductive carbon additive and polymer binder and pressed on stainless steel mash current collector initial capacity immediately reaches maximal capacity at the cycling rate of 140 mAh/g, but substantially decreases by prolonged cycling. This underlines importance of superior electronic contact and excellent ionic conductivity that is obtained by electrochemical deposition, which are key factors in stable and reversible operation of batteries. The monotonic slope of the bilayered $V_2O_5$ voltage profiles confirms the absence of phase transitions during the charge-discharge processes (FIG. 14). The results indicate that bilayered $V_2O_5$ structure is capable of sustaining single-phase intercalation of large Na+ ions in wide concentration range and does not change morphology during repeated cycling. (FIG. 17) These findings suggest the advantage of non-3D crystalline structures that are far away from the thermodynamic equilibrium for applications in batteries operating on sodium ion exchange.

Figure 15:
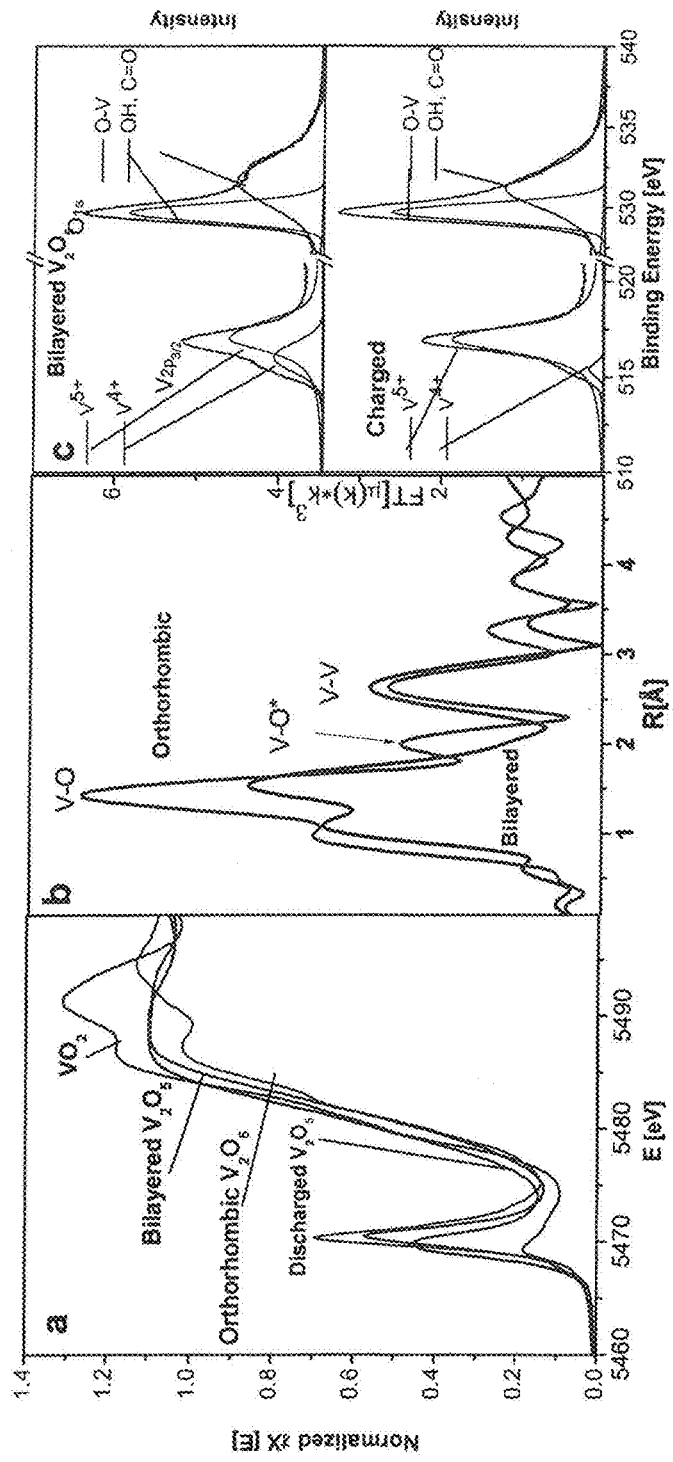
FIG. 15. (A) Normalized V K-edge XANES for $VO_2$ ($V^{4+}$ standard), bilayered $V_2O_5$ and orthorhombic $V_2O_5$ ($V^{5+}$ standard) electrodes. (B) Phase-uncorrected Fourier transforms of V K-edge EXAFS ($k^3$-weighted) for bilayered $V_2O_5$ and orthorhombic $V_2O_5$ electrodes. (C) XPS spectra of bilayered $V_2O_5$, before (top) and after 10 cycles of charging with Na+-ions (bottom) in the V $2p_{3/2}$ and O 1s core level regions.

The oxidation state of the material is essential for redox processes that are taking place in rechargeable batteries, and for that reason we utilized X-ray absorption near edge spectra (XANES) in the V K-edge range for the bilayered $V_2O_5$, orthorhombic-$V_2O_5$ ($V^{5+}$ standard) and $VO_2$ ($V^{4+}$ standard). The obtained values were consistent with the previous results of $V_2O_5$ compounds and showed identical pre-edge shape and peak positions, implying that the V redox state in the bilayered $V_2O_5$ sample is close to $V^{5+}$, in a common $VO_5$ environment (FIG. 15A). However, the area of the pre-edge peak for bilayered is smaller than that of orthorhombic $V_2O_5$ electrode. These variations in the area of the pre-edge peak indicate that the local structure of V in bilayered $V_2O_5$ has a higher degree of local symmetry than that of V in orthorhombic $V_2O_5$.

In addition, comparison of the V-K-edge $k^3$ weighted EXAFS spectra show important differences (FIG. 15B). The structure of the first two peaks is dominated by single scattering contributions from the first and second coordination spheres of V—O and V—V correlations. The scattering contributions of V—O bond in orthorhombic $V_2O_5$ is split into two components, one shorter bond distance corresponding to distances within square pyramidal environment, and longer V—O* distance with major contribution from oxygen atoms from neighboring planes in orthorhombic structure. This longer bond distance is absent in Fourier transform spectra of bilayered structure due to the shorter bond between V and O atoms in bisquare pyramidal arrangement.

Figure 19:
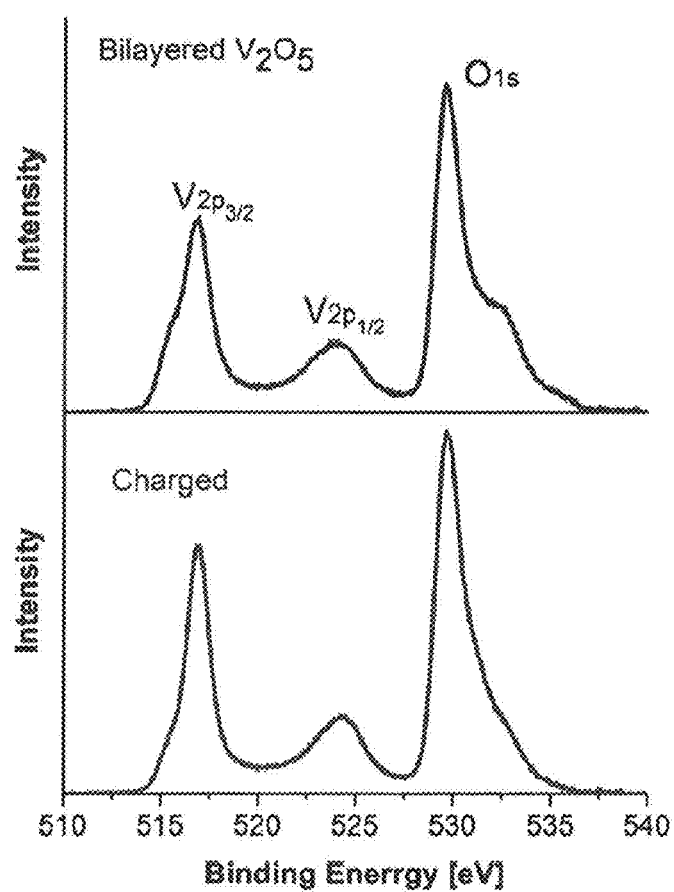
FIG. 19. XPS spectra of bilayered $V_2O_5$, before (top) and after 10 cycles of charging with $Na^+$ ions (bottom) in the V 2p and O 1s core level regions.

The position and shape of the V 2p and O 1s XPS peaks before and after cycling of bilayered $V_2O_5$ electrodes confirms the reversibility of Na+ intercalation (FIG. 15C). The peak at 516.9 eV is assigned to the $V^{5+}$ $2p_{3/2}$, while shoulder at 515.7 eV to the $V^{4+}$ $2p_{3/2}$ orbital, which is additionally confirmed by the spin-orbit splitting of about 7.5 eV between V $2p_{3/2}$ and V $2p_{1/2}$ (FIG. 19). Composition of the electrochemically synthesized bilayered $V_2O_5$ electrode before the intercalation of Na+ shows slightly reduced content of V, indicated by 25% of total vanadium in $V^{4+}$. However, after 82 cycles, V $2p_{3/2}$ peak shape for the sample in a charged (oxidized) state constitutes of 95% of $V^{5+}$ and 5% of $V^{4+}$ state, confirming efficient reversible intercalation and deintercalation of Na+ ions in bilayered $V_2O_5$ structure. In the O 1s region, the main peak attributed to lattice oxygen (O—V) is located at 531 eV, however, we observed additional shoulder at the higher binding energy side in electrochemically synthesized $V_2O_5$, which was previously assigned to chemisorbed water or adsorbed carbon dioxide molecules. This side peak shifted upon cycling suggesting surface adsorption of electrolyte molecules that replace initially adsorbed carbon dioxide during electrode cycling.

Figure 16:
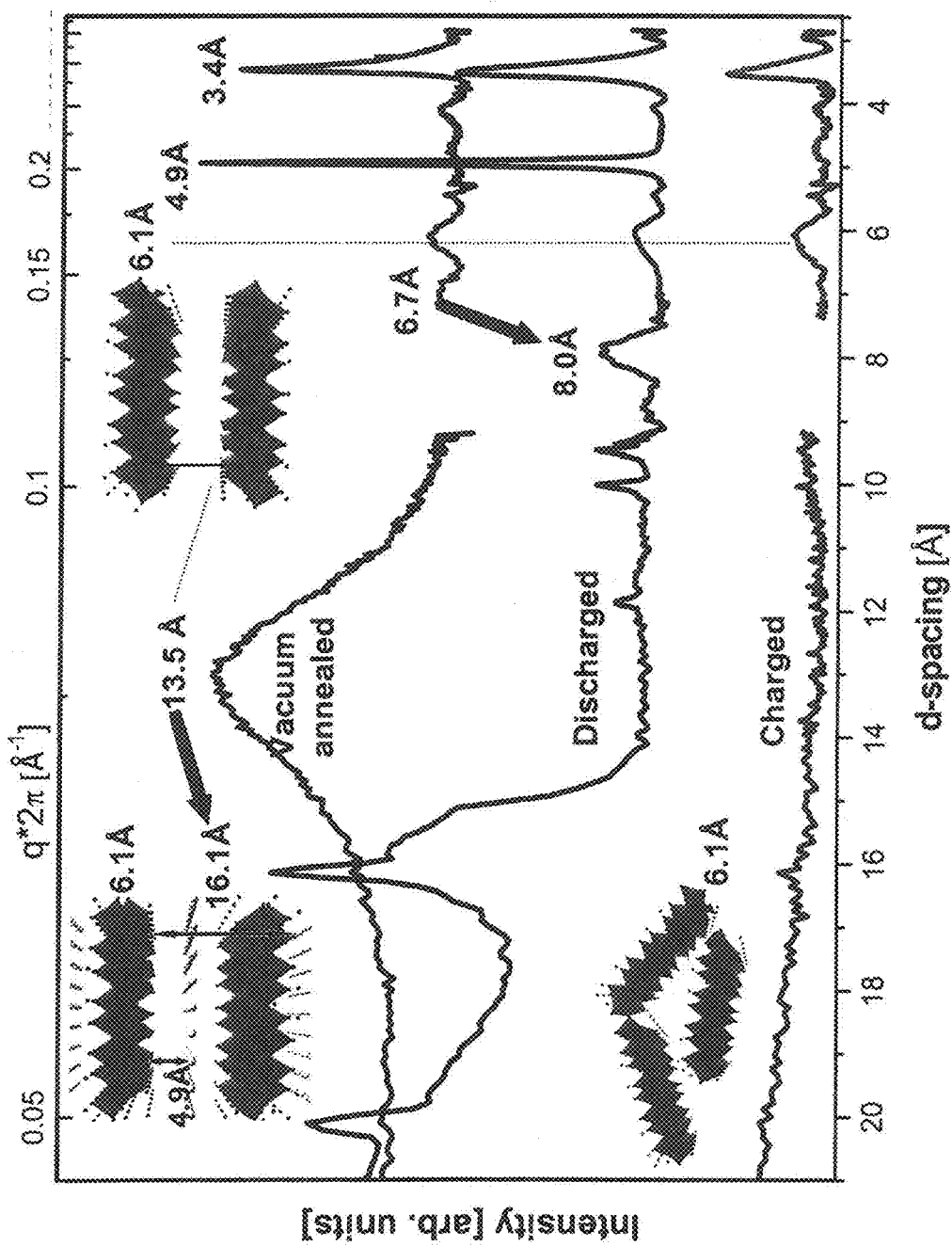
FIG. 16. SAXS and WAXS spectra for bilayered $V_2O_5$: electrochemically deposited vacuum annealed sample, after discharging with the current of 630 μA (black), 120 μA (gray) or 20 μA (light gray), as well as after cycling at 120 μA in charge state. Model structures and critical interlayer spacing depicting transformations occurring upon Na+ intercalation and deintercalation are also shown.

In order to understand mechanism of sodium insertion/de-insertion as well as the limits of discharge capacity and cyclability of bilayered $V_2O_5$ electrodes, it is important to understand the response of the bilayered $V_2O_5$ structure to the intercalation of sodium. For this purpose, we have used X-ray scattering that is a technique of choice for determining the changes in both short and long range order in crystalline and non-crystalline materials. Small and Wide angle X-ray scattering (SAXS and WAXS) measurements in situ (non-operando) confirm the initial structure of vacuum annealed bilayered $V_2O_5$ that was obtained from XRD measurements, i.e., layered structure with bilayers spaced at average distance of 13.5 Å apart, and the structural order within bilayers showing characteristic 3.44 Å spacing (FIG. 16). SAXS measurements confirm the change of periodicity and the stacking order upon intercalation and deintercalation of Na+ ions.

Figure 20:
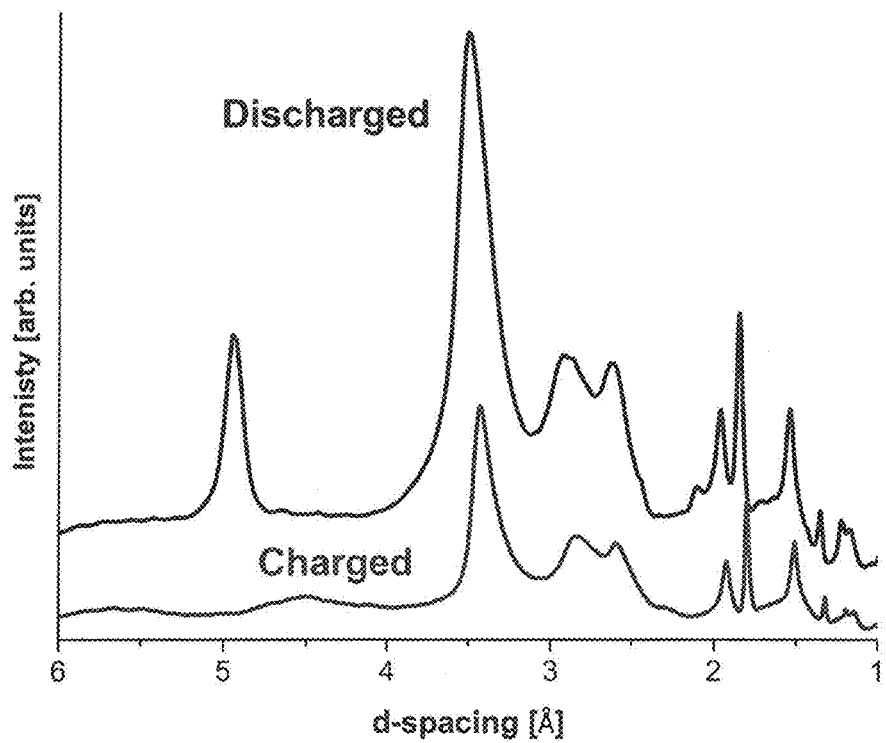
FIG. 20. Synchrotron X-ray diffraction spectra of bilayered $V_2O_5$ annealed in vacuum at 120° C., before and after $Na^+$ ion intercalation. In each case $V_2O_5$ was deposited at an anodic current density of 5 $mAcm^{-2}$.

Upon initial discharging we observed that the interlayer d-spacing of the (001) plane (13.5 Å) and corresponding (002) plane (6.7 Å) dramatically change upon intercalation of sodium to 16.1 Å and 8.0 Å, respectively. Concomitantly, the width of the layer spacing peak narrows, and several peaks in the wide-angle region sharpen, suggesting 3D-like ordering of the structure upon sodium intercalation. Moreover, superimposed to the broader scattering pattern corresponding to newly developed sodium ion assembled layered structure one can observe a set of very narrow peaks, which originate from defined distances of intercalated sodium atom with atoms constituting the $V_2O_5$ bilayer. The intensity of these sharp features depends on the applied discharge currents (FIG. 16, black and gray curves). One can observe exceptionally strong narrow peak at 4.9 Å that corresponds to the distance between intercalated Na+ ions and neighboring oxygen atoms that terminate the bilayered structure, which was also observed in XRD of discharged sample (FIG. 20).

Upon electrode oxidation (charging), and consequent Na+ deintercalation, this peak completely vanishes, confirming complete removal of Na ions in agreement with XPS restoration of $V^{5+}$ state. Also all of the peaks associated with layered structure disappear and only those associated with short range order within bilayered structure are preserved. This suggests that after deintercalation of Na+ ions from the structure the stacking order is removed (FIG. 16). These measurements strongly indicate that bilayered stacking and large spacing of bilayered structure is crucial for efficiency and stability of reversible Na+ ion intercalation in $V_2O_5$ electrodes. These flexible non-crystalline layers reassemble into organized structure each time Na+ ions intercalate into electrode. Electrostatic interaction between sodium ions and bilayer terminating oxygen atoms fixates the stacking of bilayers. However, upon oxidation (charging) the electron density of terminating oxygen atoms decreases, weakening their interaction with Na+ ions that causes deintercalation of Na+, which leaves random ordering between the layers.

The extent of ordering and corresponding intensity of scattering features is dependent on the current density used for intercalation of Na+ ions. Interestingly, the highest current leads to more pronounced peaks, suggesting that higher concentration (flux) of intercalated atoms produces better ordering of the lattice. Moreover, the specific capacity of fast cycled electrode improves with the cycling. The full capacity of this electrode is established only after a number of cycles at high scanning rate, emphasizing the importance of availability of Na+ ions on electrode surface for obtaining theoretical capacities. Therefore, the superior discharge capacity retention of bilayered $V_2O_5$ electrodes compared to the other nanostructured vanadium pentoxide electrode reported in the literature may be attributed to the combined effects of their structural and surface properties. Highly accessible nanoscale architecture that combines conductivity with high surface area plays crucial role for ion and electron transport at the electrode/electrolyte interface.

It has been shown recently that the increased number of electrode/electrolyte interfacial interactions in nanostructured materials is critical to the formation of percolation pathways for fast diffusion of ions. Extensive adsorption of large sodium ions at the nanostructured electrochemical interface is important to initiate the intercalation process. At the same time the layered nature of the active material with low energy sites drives the Na+ diffusion into the material bulk structure. The combination of these processes is necessary for maximizing the flow of Na+ ions into the material. The net effect is enhanced pseudocapacitance that maximizes the electrostatic attraction of Na+ cations into $V_2O_5$ matrix. In addition, charge transfer ability of the bilayered $V_2O_5$ electrode is improved with the presence of more conductive surface defect species such as lower valence vanadium atoms (FIG. 15C) and associated oxygen vacancies. Enhanced charge transfer conductivity improves electron transport during sodium ion intercalation/deintercalation at the electrode/electrolyte interface. Undoubtedly, this is sufficient to stimulate efficient diffusion of the large concentration of transporting ions into metal oxide layered framework with concomitant reduction/oxidation of V atoms.

Synthesis of Nanostructured $V_2O_5$ Electrodes.

Nanostructured $V_2O_5$ was synthesized by electrochemical deposition on pure Ni foil (0.0127 mm, 99.8%), which was cleaned in acetone and isopropyl. The electrochemical deposition was carried out in a three-electrode cell with Ni foil as the working electrode, Pt mesh as a counter electrode and Ag/AgCl as a reference electrode in aqueous 0.1 M $VOSO_4$ solution at a constant potential of 1.5 V. Bilayered $V_2O_5$ electrodes were synthesized by vacuum annealing at 120° C. for 20 hours. The crystallized orthorhombic $V_2O_5$ electrodes were obtained by annealing of as-prepared $V_2O_5$ under $O_2$ atmosphere at 500° C. for 4 hours.

Electrochemical Insertion/Extraction of $Na^+$ and Characterization.

Na-half cells were assembled in He-filled dry glove box into coin-type cells with a Na foil as the negative electrode, an electrolyte of 1 M $NaClO_4$ in propylene carbonate (PC) and glassy fiber separator. For comparison, traditional electrode was made by mixing 84 wt % active material ($V_2O_5$ powder, Aldrich), 4 wt % graphite (Timcal, SFG-6), 8 wt % poly(vinylidine difluoride) binder (Kynar), and 4 wt % carbon black (Toka) and pressed on stainless steel mesh current collector. All cells were tested galvanostatically by automated Maccor battery tester at ambient temperature. Cyclic voltammograms of the cells were recorded in a Solartron 1470E Potentiastat/Galvanostat.

Synchrotron XRD Measurements.

X-ray diffractions were performed at the beamline 13-ID-D of GSECARS sector at Advanced Photon Source (APS) at Argonne National Laboratory. The X-ray beam (37 keV energy, corresponding to X-ray wavelength of $\lambda=0.3344$ Å) was focused to a 2 μm diameter spot with a Kirkpatrick-Baez mirror system. The distance and tilting of the MAR165-CCD detector were calibrated using a $CeO_2$ standard. $V_2O_5$ samples were prepared by stripping the $V_2O_5$ film from Ni support onto Kapton tapes. Electrodes removed from cells for analysis were thoroughly washed with dry dimethyl carbonate and dried under inert atmosphere. The charged samples were also prepared by stripping $V_2O_5$ films onto Kapton tape. The discharged samples were scratched-off and sealed inside a 3 mm-diameter hole in a piece of aluminum foil by sealing Kapton sheet to the foil using epoxy. All cell operations were performed in a He-filled dry glove box (oxygen level <2 ppm). Simulations of XRD patterns were carried out using CrystalMaker software (CrystalMaker Software, Ltd.) and are shown in FIG. 18.

Synchrotron SAXS/WAXS Measurements.

SAXS/WAXS data were collected at Beamline 12ID-B of the Advanced Photon Source (APS) at the Argonne National Laboratory (ANL). The X-ray was focused, and the spot size on the sample was about 50 μm×50 μm. SAXS and WAXS data were presented in momentum transfer, q ($q=4\pi \sin \theta/\lambda$, where θ is one-half of the scattering angle, and $\lambda=1.033$ Å is the wavelength of the 12 keV energy probing X-ray), measured in the range 0.01-2.3 $Å^{-1}$. The charged samples were prepared by stripping $V_2O_5$ films onto Kapton tape. The discharged samples were scratched-off and sealed inside a 3 mm-diameter hole in a piece of aluminum foil by sealing Kapton sheet to the foil using epoxy. All cell assembly and disassembly operations were performed in a He-filled dry glove box (oxygen level <2 ppm).

XPS.

Scienta hemispherical electron analyzer (SES100) was used to obtain the XPS/UPS measurements and total energy resolution of spectra, including photon energy, was set to less than about 0.1 eV. The acceptance angle for incoming electrons is (+)5 degree. All experimental data were taken under the pressure of $2\times10^{-10}$ torr or less.

Electron Microscopy.

Scanning Electron Microscopy (SEM) images were recorded with a JEOL JSM-7500F Field Emission SEM operating at 30 kV.

XANES.

X-ray spectroscopy (XAS) and extended X-ray absorption fine structure (EXAFS) measurements were performed at PNC-XOR bending magnet beamline (20-BM-B) of APS in Argonne National Laboratory. Measurements at V K-edge were performed under transmission mode using gas ionization chambers to monitor the incident and transmitted X-ray intensities. A third ionization chamber was used in conjunction with a Ti-foil standard to provide internal calibration for the alignment of the edge positions. The incident beam was monochromatized using a Si (111) double crystal fixed exit monochromator. Harmonic rejection was accomplished using a Rhodium coated mirror. The charged samples were prepared by stripping $V_2O_5$ films onto Kapton tape. The discharged samples were scratched-off and sealed inside a 3 mm-diameter hole in a piece of aluminum foil by sealing Kapton sheet to the foil using epoxy. All cell assembly and disassembly operations were performed in a He-filled dry glove box (oxygen level <2 ppm). The reference standards ($V^{5+}$ and $V^{4+}$) were prepared by spreading thin, uniform layers of the $V_2O_5$ and $VO_2$ power in Kapton tape and stacking a few layers to attain the desired absorption step height. Each spectrum was normalized using data processing software package IFEFFIT. Alignment of each sample reference spectrum with respect to V standard spectrum is within the range of ±0.03 eV.

SEM Characterization of Morphology Before and after Cycling.

Figure 17:
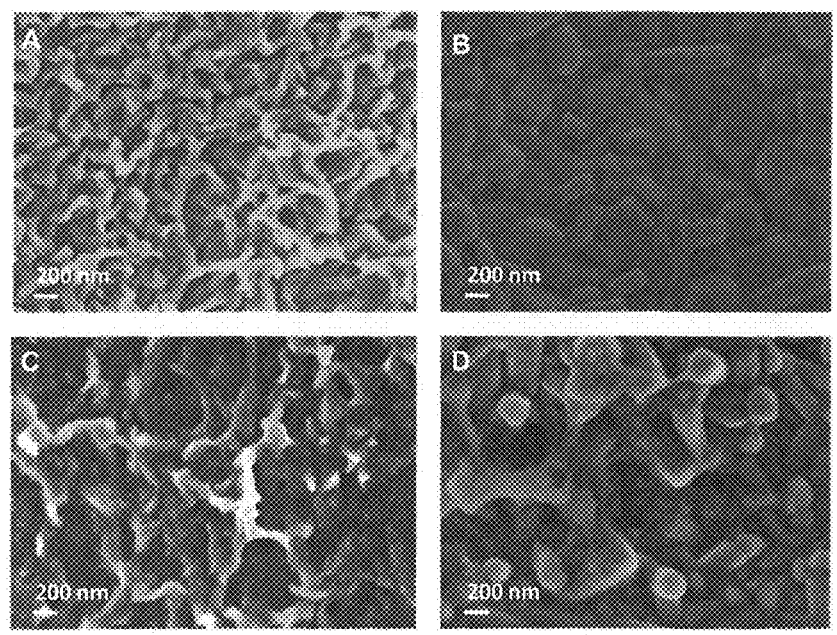
FIG. 17. Surface morphology of electrolytic vanadium oxide film after annealing in vacuum at 120° C. and oxygen at 500° C.: before cycling (a, c) and after cycling with $Na^+$ ions (b, d) respectively. All films were deposited at an anodic current density of 5 mA $cm^{-2}$.

SEM images of both layered and crystalline $V_2O_5$ electrodes before and after electrochemical cycling in Na system are shown in FIG. 17. As-prepared and 120° C. vacuum annealed $V_2O_5$ electrodes (a) are composed of nanoribbons with highly porous structure and there is no noticeable change in the surface morphology after cycling (c) indicating high mechanical strength of this material. It should be noted that the debris on the cycled nanoribbons is from residues of the electrolyte. Crystalline structure of orthorhombic $V_2O_5$ particles (b) deteriorated during cycling (d). Large irreversible capacity in the 1st cycle (FIG. 14A) due to series of irreversible phase transformation during the first discharge process, badly affect the overall battery performance. The breakdown in the crystal structure (FIG. 15) did not result in the immediate failure of the cathode material, only a continuous decline in electrode capacity (FIG. 14A).

XPS Characterization of V Valence State Before and after Cycling.

The V2p and O1s peaks are shown in FIG. 19. The peak at 516.9 eV is assigned to the $V^{5+}$ $2p_{3/2}$ orbital, peak at 524 eV to $V^{5+}$ $2p_{1/2}$ orbital and that at 515.7 eV to the $V^{4+}$ $2p_{3/2}$ orbital. The spin-orbit split of $V2p_{3/2}$ and $V2p_{1/2}$ is about 7.5 eV, consistent with the previous reports in the literature.

XRD Characterization of Bilayered $V_2O_5$ Structure Before and after Na+ Intercalation.

Synchrotron X-ray diffraction spectra of bilayered $V_2O_5$ vacuum annealed at 120° C., before and after cycling with $Na^+$-ions are shown in FIG. 20. The bilayered $V_2O_5$ structure is composed of 2D bilayered stacks. The interlayer distance between the two single sheets of $V_2O_5$ making up the bilayer is close to 3.44 Å. This structure is reminiscent of the $V_2O_5$ xerogels in which monoclinic bilayers of $V_2O_5$ stack up with the spacing that expands (or contracts) as the xerogel incorporates (releases) water molecules in its structure. Upon Na$^+$ intercalation, one can observe exceptionally strong narrow peak at 4.9 Å that corresponds to the distance between intercalated Na$^+$ ions and neighboring oxygen atoms that terminate the bilayered structure.

In summary, nanostructured thin films of vanadium oxide prepared on Ni metal substrates by electrochemical deposition have been used as cathodes for Na-ion batteries without the need of electro-conductive carbon additives and polymeric binder. The above theoretical capacity of 250 mAh/g at room temperature, and electrolyte stable redox potentials around 3 V translates into an energy density of about 760 Wh/kg. Stable and reversible high capacity on repeated cycling (C/8) makes bilayered $V_2O_5$ a suitable cathode material for high-energy density rechargeable sodium batteries.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All numerical values obtained by measurement (e.g., weight, concentration, physical dimensions, removal rates, flow rates, and the like) are not to be construed as absolutely precise numbers, and should be considered to encompass values within the known limits of the measurement techniques commonly used in the art, regardless of whether or not the term "about" is explicitly stated. All methods described herein can be performed in any suitable order unless otherwise indicated herein or otherwise clearly contradicted by context. The use of any and all examples, or exemplary language (e.g., "such as") provided herein, is intended merely to better illuminate certain aspects of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A crystalline nanostructured metal oxide material for use as a component of an electrode in a lithium-ion battery; wherein the crystalline nanostructured metal oxide material is produced by electrochemical anodization of a surface of a titanium foil substrate to form an amorphous film of $TiO_2$ nanotubes, subsequently drying the amorphous film to remove water, and then charging and discharging the amorphous film in a lithium electrochemical cell from a high voltage in the range of about 2.6 to 3 V, to a low voltage in the range of about 0.7 to 1 V, over a period of about 1/30 of an hour or less.

2. The nanostructured metal oxide material of claim 1 wherein the titanium dioxide nanotubes comprise densely packed $TiO_2$, nanotubes oriented perpendicular to the surface of the titanium foil substrate.

3. The nanostructured metal oxide material of claim 2 wherein the densely packed $TiO_2$ nanotubes have a wall thickness of about 8 to 12 nm and an outer tubular diameter of about 50 to 70 nm.

4. The nanostructured metal oxide material of claim 2 wherein the densely packed $TiO_2$ nanotubes have a wall thickness of about 18 to 25 nm and an outer tubular diameter of about 100 to 150 nm.

5. A lithium-ion electrochemical cell comprising a cathode, an anode and a nonaqueous lithium-containing electrolyte therebetween, wherein the anode comprises the nanostructured metal oxide material of claim 1.

6. A lithium-ion battery comprising a plurality of electrochemically linked electrochemical cells of claim 5.

\* \* \* \* \*